(12) United States Patent
Oberg et al.

(10) Patent No.: US 9,922,210 B2
(45) Date of Patent: Mar. 20, 2018

(54) COMPONENTIZED PROVISIONING

(71) Applicant: SRI International, Menlo Park, CA (US)

(72) Inventors: Scott A. Oberg, Paso Robles, CA (US); Christopher S. Lockett, Santa Clara, CA (US); Sean M. Forsberg, San Luis Obispo, CA (US); Hassen Saidi, Menlo Park, CA (US); Jeffrey E. Casper, San Carlos, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 260 days.

(21) Appl. No.: 14/051,923

(22) Filed: Oct. 11, 2013

(65) Prior Publication Data

US 2014/0379923 A1    Dec. 25, 2014

Related U.S. Application Data

(60) Provisional application No. 61/839,202, filed on Jun. 25, 2013.

(51) Int. Cl.
*G06F 15/16* (2006.01)
*G06F 21/74* (2013.01)
(Continued)

(52) U.S. Cl.
CPC .............. *G06F 21/74* (2013.01); *G06F 9/542* (2013.01); *G06F 21/00* (2013.01); *G06F 21/575* (2013.01);
(Continued)

(58) Field of Classification Search
CPC ......... H04L 47/70; H04L 63/20; H04L 63/08; G06F 21/575; G06F 21/74; G06F 9/542;
(Continued)

(56) References Cited

U.S. PATENT DOCUMENTS 8,519,820 B2   8/2013  Cannistraro
8,843,997 B1 * 9/2014  Hare ...................... H04L 29/06
                                                            709/200
(Continued)

OTHER PUBLICATIONS

SRI International, "SRI International Begins Final Development of Commercial Trusted Mobility Devices for U.S. Marine Corps," Apr. 8, 2013, 1 page, available at http://www.sri.com/newsroom/press-releases/sri-begins-final-development-commercial-trusted-mobility-devices.

(Continued)

*Primary Examiner* — Bryan Lee
(74) *Attorney, Agent, or Firm* — Hickman Palermo Becker Bingham LLP

(57) ABSTRACT

A provisioning system can separately and independently provision different components for different purposes on a computing platform, and enforce component-specific purposes associated with the use of the individual provisioned components during operation of the platform. Some versions of the provisioning subsystem may operate on a virtualized mobile computing device and networked devices under control of the computing device. In some embodiments, the provisioning subsystem can enforce a desired "purpose" of a provisioned component while simultaneously denying a corresponding "anti-purpose."

30 Claims, 13 Drawing Sheets

(51) Int. Cl.

| | | |
|---|---|---|
| *H04L 29/06* | (2006.01) | |
| *G06F 9/54* | (2006.01) | |
| *G06F 21/60* | (2013.01) | |
| *G06F 21/00* | (2013.01) | |
| *G06F 21/57* | (2013.01) | |
| *H04W 12/08* | (2009.01) | |
| *H04W 12/06* | (2009.01) | |

(52) U.S. Cl.
CPC .............. *G06F 21/60* (2013.01); *H04L 63/08* (2013.01); *H04L 63/20* (2013.01); *G06F 2221/2101* (2013.01); *H04W 12/06* (2013.01); *H04W 12/08* (2013.01)

(58) Field of Classification Search
CPC .. G06F 21/60; G06F 21/00; G06F 2221/2101; H04W 12/06
See application file for complete search history.

(56) References Cited

U.S. PATENT DOCUMENTS

| | | | | |
|---|---|---|---|---|
| 2007/0043736 | A1* | 2/2007 | Jain | G06F 17/30864 |
| 2008/0250493 | A1* | 10/2008 | Bassani | G06F 21/604 726/17 |
| 2009/0125880 | A1* | 5/2009 | Manolescu | G06F 8/24 717/110 |
| 2010/0250955 | A1* | 9/2010 | Trevithick | G06F 21/31 713/185 |
| 2011/0055385 | A1* | 3/2011 | Tung | G06F 9/5072 709/224 |
| 2011/0165896 | A1* | 7/2011 | Stromberg | G06Q 20/32 455/466 |
| 2011/0289200 | A1* | 11/2011 | Patil | G06F 9/5027 709/223 |
| 2012/0110055 | A1* | 5/2012 | Van Biljon | G06Q 30/04 709/201 |
| 2013/0152092 | A1 | 6/2013 | Yadgar | |
| 2014/0115693 | A1* | 4/2014 | Schieman | G06F 21/53 726/17 |
| 2014/0280952 | A1* | 9/2014 | Shear | H04L 47/70 709/226 |
| 2015/0324219 | A1* | 11/2015 | Fitzgerald | G06F 8/60 718/1 |

OTHER PUBLICATIONS

Carl L. Nerup et al., "A High Assurance Framework for Mobile/Wireless Device Applications," 2012, 15 pages, available at http://www.ok-labs.com/_assets/OK-WP-High-Assurance-Framework-022712.pdf.

Rob McCammon, "SecureIT Mobile: How to Build a More Secure Smartphone with Mobile Virtualization and Other Commercial Off-the-Shelf Technology," 2010, 14 pages.

Grit Denker et al., "Policy-Based Date Downgrading: Toward a Semantic Framework and Automated Tools to Balance Need-To-Protect and Need-To-Share Policies," IEEE International Symposium on Policies for Distributed Systems and Networks, Jun. 17, 2010. 9 pages.

Common Criteria for Information Tehcnology Security Evaluation, "Part 1: Introduction and General Model," v. 3.1, rev. 3, Jul. 2009, 93 pages, available at http://www.commoncriterialportal.org/files/ccfiles/CCPART1V3.1R3.pdf.

Common Criteria for Information Tehcnology Security Evaluation, "Part 2: Security Functional Components," v. 3.1, rev. 3, Jul. 2009, 321 pages, available at http://www.commoncriterialportal.org/files/ccfiles/CCPART2V3.1R3.pdf.

Common Criteria for Information Tehcnology Security Evaluation, "Part 3: Security Assurance Components," v. 3.1, rev. 3, Jul. 2009, 232 pages, available at http://www.commoncriterialportal.org/files/ccfiles/CCPART3V3.1R3.pdf.

J. M. Rushby et al., "The MILS Component Integration Approach to Secure Information Sharing,"Proceedings of the 27th IEEE/AIAA Digital Avionics Systems Conference, 2008, 12 pages, St. Paul, MN, USA.

National Information Assurance Partnership: Common Criteria Evaluation & Validation Scheme, "U.S. Government Protection Profile for Separation Kernels in Environments Requiring High Robustness," v. 1.03, Jun. 29, 2007, 182 pages, available at http://www.niap-ccevs.org/pp/pp_skpp_hr_v1.03.pdf.

Rance Delong et al., "Toward a Medium-Robustness Separation Kernel Protection Profile," 2007, 10 pages available at http://www.acsac.org/2007/papers/168.pdf.

Jonathon Corbet, "dm-verity", Rhino Security Labs, 2011, 4 pages.

Dmitry Kasatkin, "[dm-devel] [PATCH 0/1] dm-integrity: Integrity Protection Device-Mapper Target", http://www.redhat.com/archives/dm-devel/2012-September/msg00320.html, 2 pages.

TrustZone, ARM The Architecture for the Digital World; http://www.arm.com/products/processors/technologies/trustzone.php, 5 pages.

Trustonic; Trusted Execution Environment, http://www.trustonic.com/products-services/trusted-execution-environment, 1 page.

Open Kernel Labs, OKL4 Microviser : Open Kernel Labs, http://www.ok-labs.com/products/okl4-microvisor, 4 pages.

Christopher S. Lockett et al., unpublished U.S. Appl. No. 14/052,266, filed Oct. 11, 2013, 140 pages.

Hassen Saidi et al., unpublished U.S. Appl. No. 14/052,169, filed Oct. 11, 2013, 55 pages.

Sean M. Forsberg et al., unpublished U.S. Appl. No. 14/052,080, filed Oct. 11, 2013, 69 pages.

Scott A. Oberg et al., unpublished U.S. Appl. No. 14/051,923, filed Oct. 11, 2013, 70 pages.

Scott A. Oberg et al., unpublished U.S. Appl. No. 13/872,865, filed Apr. 29, 2013, 49 pages.

Kenneth C. Nitz et al., unpublished U.S. Appl. No. 13/585,003, filed Aug. 14, 2012, 63 pages.

Kenneth C. Nitz et al., unpublished U.S. Appl. No. 13/585,008, filed Aug. 14, 2012, 63 pages.

Edgar T. Kalns et al., unpublished U.S. Appl. No. 13/891,858, filed May 10, 2013, 67 pages.

Edgar T. Kalns et al., unpublished U.S. Appl. No. 13/891,864, filed May 10, 2013, 65 pages.

Unpublished U.S. Appl. No. 61/839,202, filed Jun. 25, 2013, 63 pages.

Redbend Software, A New Solution for Managing Embedded Handset Software, printed May 7, 2013, 6 pages.

GlobalPlatform made simple guide: Trusted Execution Environment (TEE) Guide, available at http://www.globalplatform.org/mediaguidetee.asp, printed Aug. 16, 2013, 4 pages.

Forsberg, U.S. Appl. No. 14/052,080, filed Oct. 11, 2013, Notice of Allowance, mailed Jun. 6, 2017.

\* cited by examiner

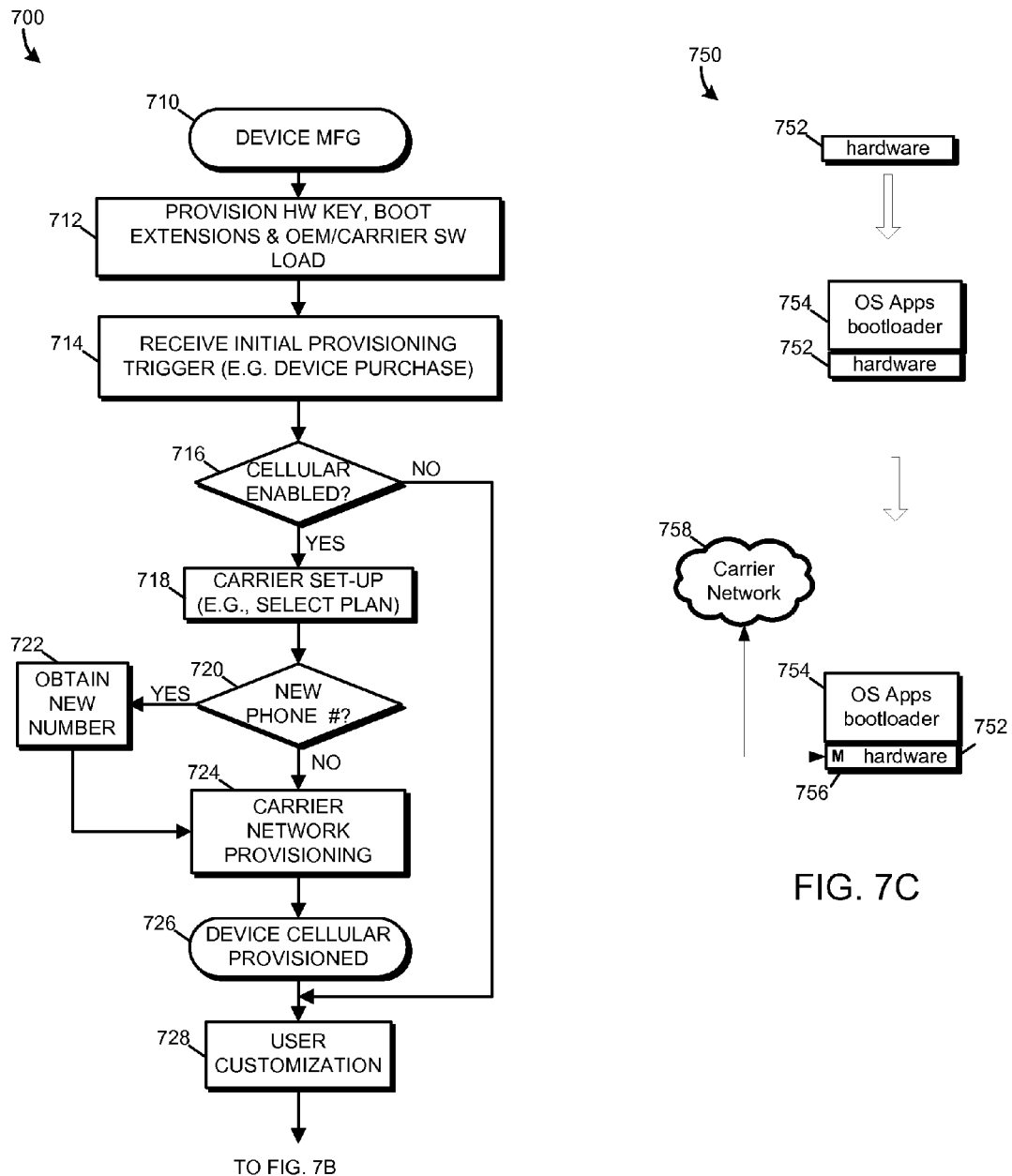

COMPONENTIZED PROVISIONING

CROSS-REFERENCES TO RELATED APPLICATIONS

This application claims the benefit of and priority to U.S. Provisional Patent Application Ser. No. 61/839,202, filed Jun. 25, 2013, which is incorporated herein by this reference in its entirety.

This application is related to U.S. Utility application Ser. No. 13/872,865 filed Apr. 29, 2013, of Oberg et al., titled "Operating System Independent Integrity Verification," which is incorporated herein by this reference in its entirety.

This application is related to U.S. Utility application Ser. No. 14/052,080 filed on even date herewith, of Forsberg et al., titled "Flexible Policy Arbitration Control Suite,", which is incorporated herein by this reference in its entirety.

This application is related to U.S. Pat. No. 9,495,560 filed on even date herewith, of Saidi et al., titled "Polymorphic Virtual Appliance Rule Set,", which is incorporated herein by this reference in its entirety.

This application is related to U.S. Utility Application Ser. No. 14/052,266 filed on even date herewith, of Lockett et al., titled "Polymorphic Computing Architectures,", which is incorporated herein by this reference in its entirety.

BACKGROUND

Traditional system architectures for computing platforms, and mobile systems in particular (such as smart phones, tablet computers, wearable devices, and others), have a monolithic, vertical design in which execution of applications stored on the file system, device drivers, and software stacks, is controlled by the operating system kernel. A consequence of traditional system architectures is the co-location of the software into a single environment, resulting in several million lines of software code for a single system. A direct result of this approach is a highly complicated, co-mingled architecture in which it is extremely difficult to identify, mitigate and correct vulnerabilities. A security issue raised by a software application running on the device can therefore impact the entire system. As a consequence, it can be challenging to reliably and consistently maintain the security of the execution environment in traditional, overly complex systems.

The potential security risks posed by the large "attack surface" (e.g., the code within a computer system that can be run by unauthenticated users) of certain architectures (such as ANDROID) and by the downloading of third-party software are well-documented. The risks are even more pronounced when a computing device is used for multiple different, potentially conflicting purposes. Such may be the case in the "bring your own device" (BYOD) context in which computing devices, and more particularly, mobile computing devices, are used for both business and personal matters. These and other issues have spawned a "mobile device management" (MDM) industry.

Virtualization technology has long been a component of data center and desktop computing. Efforts are being made to apply virtualization technology to mobile devices. Proponents of mobile device virtualization believe that the technology can accelerate the development and deployment of new mobile device software at a lower cost. However, security risks exist whether a traditional monolithic or virtualized architecture is used.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 7A-7B illustrate a simplified flow diagram of at least one embodiment of a method for provisioning an electronic device as disclosed herein;

FIGS. 7C-7D illustrate simplified depictions of an electronic device during different stages of the provisioning method of FIGS. 7A-7B;

DETAILED DESCRIPTION OF THE DRAWINGS

Figure 1:
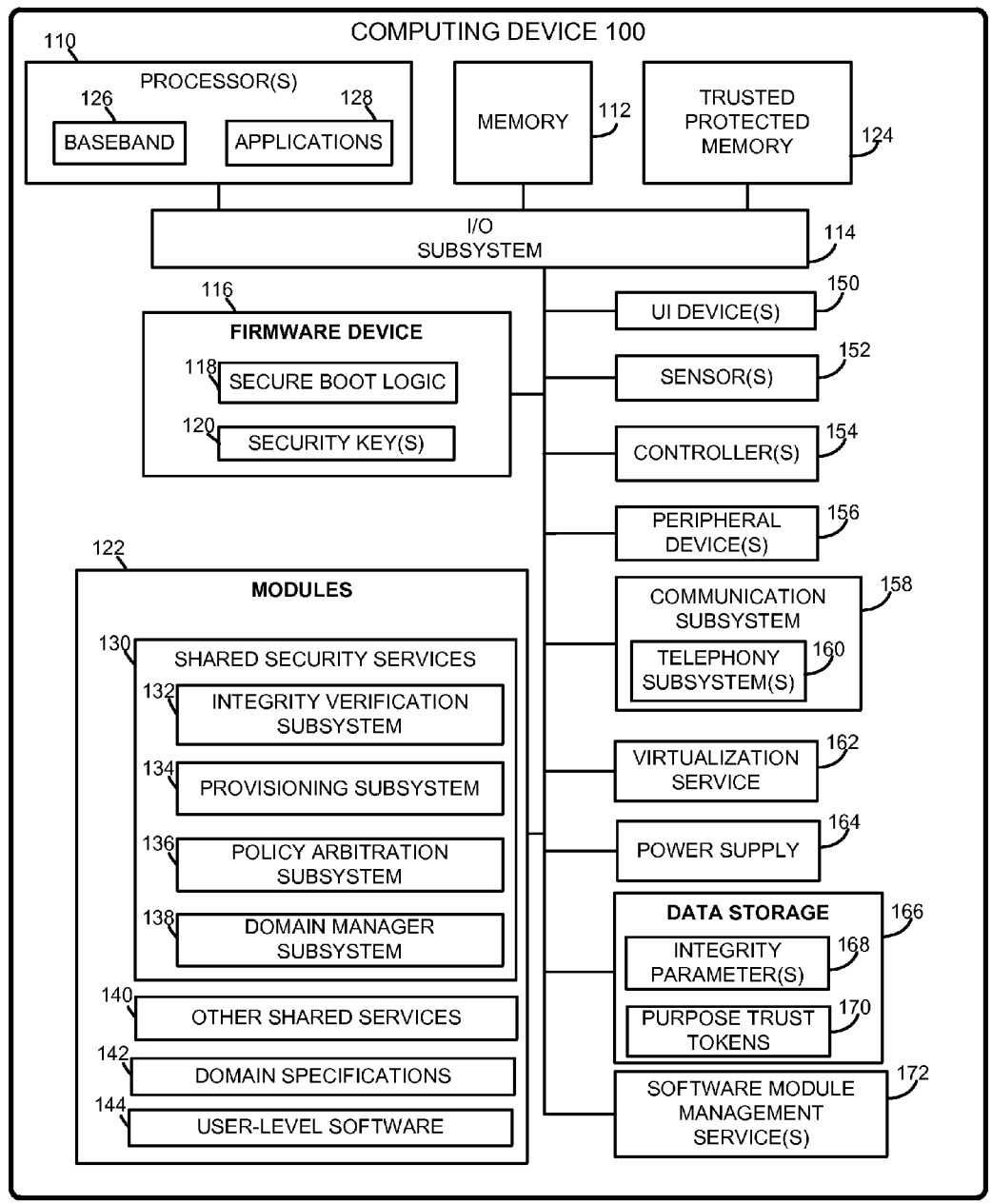
FIG. 1 is a simplified block diagram of at least one embodiment of a system architecture for a computing device, including a provisioning subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Existing mobile device management ("MDM") and other policy solutions implement static, monolithic security policies that are designed for the traditional architectures. As a result, these solutions are unable to dynamically control the use and sharing of resources, e.g., based on the purpose of an installed component and the current context of its use/operation. For example, traditional policy solutions are unable to detect whether, in a given circumstance, a device or a component thereof is being used for a specific purpose, such as a personal matter or a business-related transaction. As such, these solutions result in inflexible and often over-restrictive policy as the lack of context means they must always enact the most protective measures.

In some embodiments, MILS (Multiple Independent Levels of Security) concepts can be applied to these and other computing environments to provide a modular, component-based approach to secure system architectures, component provisioning and purpose/policy enforcement, and system certification. In general, a MILS-based platform is comprised of components that share physical resources while creating strongly separated exported resources. When composed "additively," these resources form a distributed resource sharing substrate, which may be referred to as a MILS platform. In high assurance applications, the use of a separation kernel is a component of the MILS platform. The separation kernel architecture provides for a functionally "distrusted" system of individual, separated components with well defined, limited communication channels between the components ("distrusted" in the sense that the individual components are not assumed to be trusted from a security standpoint). As used herein, a "well-defined" communication channel may refer to, among other things, one or more signal paths, which can be implemented in hardware or software, and may be implemented as a logical interface between two logical (e.g., virtualized) units, where the interface is clearly defined so that the entities on either end of the communication channel or channel are known and unchangeable, and the type of communications that are permitted to be sent over the communication channel/channel are also known and unchangeable. Once each of these well-defined communication channels or channels has been validated as such, it need not be continuously re-validated.

As disclosed herein, a provisioning subsystem 134, 254, 650 can be realized, for example, upon a MILS-based platform. For example, aspects of a provisioning subsystem 134, 254, 650 can be realized by operational components of the system architecture to achieve particular component-specific purposes. In the abstract, the architecture defines components (e.g., subjects/objects/domains/applications/subsystems) and interactions between the components. Isolation and information flow control policies govern the existence of the architectural components on the platform and their interactions with system resources and other components. Isolation policies provide that only controlled, well-defined interfaces (thus limiting the type and scope of interaction) are allowed for direct interaction between components. Furthermore, the data allowed to pass through these interfaces can be controlled by the "trusted" side of the connection or by a "trusted" component inline of the connection. Information flow control policies define explicitly permitted causality or interference between the components. Whereas current mobility policy and MDM solutions are only as secure as their parent process, the disclosed approach can provide a peer-based architecture in which peer components (such as those found in a virtualized system) are isolated from one another so as to be protected from other peer components should any of the components be compromised. Among other things, a peer-based policy architecture as disclosed herein enables individual components' policies to exist without prior or current knowledge of other individual component policies In some embodiments, the provisioning subsystem 134, 254, 650 can be employed to provide a high assurance of security for "multiple-personality" computing devices. In such devices, different user-level execution environments (e.g., personal and enterprise domains, or "unclassified" and "classified" domains) may be isolated from one another using the MILS-based techniques, so as to, for example, simultaneously protect personal privacy and enterprise security (e.g., address the "need to protect") while also enabling appropriate data sharing (e.g., the "need to share"). For instance, one domain may allow a mobile device user to access personal records such as e-mail, medical data, or financial reports, but deny access to other domains, while another domain may permit access to data and applications involving very highly confidential or secret business information, processes or operations, but deny such access to other domains. To do this, embodiments of the provisioning subsystem 134, 254, 650 may cooperate with domain isolation, encryption, policy, and other related security technologies developed by SRI International, which can be embedded into smart phones and other mobile platforms, as described in more detail below and in other patent applications of SRI International, including the related patent applications identified above. Some examples of high assurance, multiple-personality mobile devices that have been developed by SRI International were mentioned in the press release, "SRI International Begins Final Development of Commercial Trusted Mobility Devices for U.S. Marine Corps," Apr. 8, 2013 (http://www.sri.com/newsroom/press-releases/sri-begins-final-development-commercial-trusted-mobility-devices).

Referring now to FIG. 1, an illustrative computing platform 100 is embodied as a computing device configured with a modular, virtualized system architecture, as described in more detail below. It should be understood, however, that the computing platform 100 may be any type of computing device or platform, e.g., a device that has a virtualized architecture, a traditional system architecture, or a traditional system architecture configured to provide some virtualization features. For example, the computing platform 100 may be embodied as any type of personal computer (e.g., desktop, laptop, net book, e-reader, tablet, smart phone, body-mounted device, or mobile appliance), a server, server farms hosted in the cloud, an enterprise computer system, a network of computers, the network infrastructure itself, a combination of computers and other electronic devices, or other types of electronic device, including wearable computing devices, smart appliances, medical monitoring and sensing devices, commercial personal devices, health monitoring devices, embedded scientific and sensing devices, UAV's (unmanned aerial vehicles), SUAV's (small unmanned air vehicles), other types of unmanned vehicles, and other safety critical systems.

In some embodiments, the disclosed provisioning approach extends the purpose/anti-purpose concepts discussed in Denker et al., "Policy-Based Downgrading: Toward a Semantic Framework and Automated Tools to Balance Need-to-Protect and Need-to-Share Policies" (IEEE International Symposium on Policies for Distributed Systems and Networks, 2010) to a MILS-enabled provisioning subsystem 134, 254, 650. For instance, MILS-based components and policies that are only designed to achieve a particular "purpose" (or desired function) may in some contexts result in realizing an "anti-purpose" of the system (an unintended consequence). As an example, a banking application may need to share account information with others to achieve a defined "purpose," (e.g., to effectuate a transfer of funds), but in doing so, the degree of granularity of the shared information may violate a security policy "anti-purpose"—e.g., "I would like to pay my bills, but I don't want the payee to know my account balance or have the right to change the dollar amount."

Some embodiments of the provisioning subsystem 134, 254, 650 are embodied in a context-aware device (e.g., a mobile device equipped with one or more "environment" sensors, such as a GPS, accelerometer, and/or others). Such embodiments can extend a MILS-based provisioning architecture by enabling semi-dynamic provisioning implementations in the context-aware device. For example, the provisioning subsystem 134, 254, 650 can manage and enforce the embedded policy rule sets of isolated, distributed architectural components that are designed for specific purposes. Such policies/rule sets may be statically pre-defined, e.g., as information flow control channels between isolated MILS-based components. As used herein, terms such as "policy" and "purpose rule sets" may refer to, among other things, an expression of enforcement, monitoring, and/or other capabilities that are needed on the computing platform 100 to ensure that the computing platform 100 or a component thereof operates according to a defined purpose and does not perform the associated anti-purpose. For example, a purpose rule set may define criteria for sharing and/or protecting information and/or components of the computing device under various conditions and contexts. The purpose rule set may be implemented, for example, as a set of rules, instructions, data values, parameters, or a combination thereof, which may be stored in computer memory in, for example, a database or table.

In some embodiments, one or more security keys 120 used by the secure boot logic 118 and/or other modules 122 may be stored in the firmware device 116. The security keys 120 may include, for example, one or more public keys used in a digital signature scheme, which may be employed to authenticate one or more integrity parameters 166. The integrity parameters 166 may include trusted block device hashes, which may be computed at initial installation of a software module 122 by a trusted party. The integrity parameters 166 may also include current block device hashes that are computed during use of the computing platform 100, e.g., at software load time. More generally, the integrity parameters 166 can include or reference information (such as hash values) that can be evaluated by the secure boot logic 118 and/or other modules 122 to check the integrity of executable components of the computing platform 100 (including, but not limited to, the provisioning subsystem 134, 254, 650) at load time or at run time. The integrity parameters 166 and the use thereof by the computing platform 100 are described in more detail in Oberg et al., U.S. patent application Ser. No. 13/872,865.

The disclosed provisioning subsystem 134, 254, 650 may be embodied as a suite of software components, such as API (Application Programming Interface) extensions. However, some embodiments of the provisioning suite extend beyond software-only implementations. For example, some embodiments enable purpose-based component controls in systems that are designed with advanced materials in which physical properties are modified in specific contexts, such as temperature, radio frequency (RF) fields, electro-magnetic fields, and/or others. In some instances, the physical properties themselves may be a realization of a physics-based embedded policy designed for a specific purpose. Where an "anti-purpose" would otherwise result, embodiments of the provisioning subsystem 134, 254, 650 may deny access by the component to selected parts of the system. For example, component-based power control can in itself be a realization of the MILS-based "isolation" policy. As such, powering down a GPS or radio receiver is one form of isolation. Thus, in some cases, the provisioning subsystem 134, 254, 650, alone or in combination with other subsystems of the trusted computing base, may be used to implement low level resource management (e.g., device management that extends beyond the software/application layer to hardware/firmware layers) and other similar concepts, where low-level control of system components can achieve a desired "purpose" and deny the "anti-purpose."

The illustrative computing platform 100 includes at least one central processing unit or processor (e.g., a microprocessor, microcontroller, digital signal processor, etc.) 110, memory 112, trusted protected memory 124, and an input/output (I/O) subsystem 114. In the illustrated embodiment, the processor(s) 110 include a baseband processor 126 and an applications processor 128. In various embodiments, features of the baseband processor 126 and the applications processor 128 may be located on the same or different hardware devices (e.g., a common substrate). In general, the baseband processor 126 interfaces with other components of the platform 100 and/or external components to provide, among other things, wireless communication services, such as cellular, BLUETOOTH, WLAN, and/or other services. In general, the applications processor 128 handles processing required by software and firmware applications running on the computing platform 100, as well as interfacing with various sensors and/or other system resources 210. However, it should be understood that features typically handled by the baseband processor 126 may be handled by the applications processor 128 and vice versa, in some embodiments.

The processor(s) 110 and the I/O subsystem 114 are communicatively coupled to the memory 112 and the trusted protected memory 124. The memory 112 and the trusted protected memory 124 may be embodied as any type of suitable computer memory device (e.g., volatile memory such as various forms of random access memory). More specifically, the illustrative trusted protected memory 124 is configured to provide component isolation in accordance with the MILS-based techniques, as described in more detail below with reference to FIG. 3.

The I/O subsystem 114 may include, among other things, an I/O controller, a memory controller, and one or more I/O ports. In some embodiments, the I/O subsystem 114 may form a portion of a system-on-a-chip (SoC) and be incorporated, along with the processor(s) 110 and other components of the computing platform 100, on a single integrated circuit chip. As such, each or any of the components coupled to the I/O subsystem 114 may be located on a common integrated circuit chip, in some embodiments.

The illustrative I/O subsystem 114 is communicatively coupled to a number of hardware, firmware, and software components, including a firmware device 116, a number of executable modules 122, a number of user interface devices 150 (e.g., a touchscreen, keyboard, virtual keypad, microphone, etc.), one or more sensors 152 (e.g., optical sensors, motion sensors, location sensors, global positioning system (GPS) receivers, digital cameras, and the like), controllers 154 (e.g., memory controllers, I/O controllers, network interface controllers, graphics controllers, etc.), other peripheral devices 156 (e.g., cameras, audio recorders, modems, data storage interfaces, displays, speakers, and other peripheral devices), the communication subsystem 158, a virtualization service 162, a power supply 164 (e.g., a battery and/or power management unit), one or more data storage devices 166, and one or more software module management services 172. Illustratively, integrity parameters 168 and purpose trust tokens 170 (described below) are embodied, at least temporarily, in the data storage device 166, however, it should be understood that other data components may at least temporarily reside in the data storage device 166, alternatively or in addition. The illustrative firmware device 116 is embodied as a persistent storage device such as a non-volatile or read-only memory device (e.g., NAND or NOR flash memory). In the illustrative embodiments, the firmware device 116 stores secure boot logic 118. The secure boot logic 118 includes the set of computer routines commonly known as, for example, the bootloader, Unified Extensible Firmware Interface (UEFI), or Basic Input/Output System (BIOS). The secure boot logic 118 enables the computing platform 100 to start its operation once electrical power to the device is switched on, or to restart its operation in response to a user command. In some embodiments (e.g., traditional system architectures), the secure boot logic 118 loads and starts an operating system and communicates with the various other components and devices that are coupled to the I/O subsystem 114. In the illustrative virtualized mobile device architecture, however, the secure boot logic 118 loads and starts the virtualization service 162 directly from the firmware device 116, independently of or prior to launching any operating systems. As used herein, "operating system" may refer to, among other things, traditional desktop or laptop operating systems, mobile device operating systems, network operating systems, real time operating systems (RTOS) (which may be used to control, for example, unmanned or "driverless" vehicles, safety critical systems, such as insulin pumps and other medical devices, and/or others.

In the illustrative computing platform depicted by FIG. 1, the modules 122 include shared, modular security services 130 and other shared, modular services 140 that, together with the virtualization service 162, form the trusted computing base (TCB). The shared security services 130 illustratively include an integrity verification subsystem 132, the provisioning subsystem 134, a policy arbitration subsystem 136, and a domain manager subsystem 138. The shared security services 130 are described in more detail with reference to FIG. 2. The other shared services 140 include system-level services, such as device drivers, which are, in more traditional system architectures, typically provided by the operating system kernel. As used herein, "shared service" may refer to a firmware or software-based executable module that allows operating systems and other executable applications and processes to interface with the shared system resources of the computing platform 100, which may include, for example, physical or hardware resources such as one or more of the processors 110, memory 112, memory 124, I/O subsystem 114, and/or any of the devices and components that are coupled to the I/O subsystem 114, whether such components are coupled directly (e.g., via bus) or over a network.

In the illustrative platform 100, the shared services 140 are virtualized at the module level, so that in a given virtualized execution environment of the computing platform 100, the shared services 140 each map to a corresponding system resource. For example, some of the shared services 140 may be embodied as device drivers that each map to a physical device driver for a different hardware component of the computing platform 100. By modularizing and isolating the shared services 140 independently of any particular component or domain, access to the shared resources of the computing platform 100 can be monitored, controlled and restricted at the module level. In general, the modules 122 are illustrated as such for discussion purposes, and such illustration is not intended to imply that any specific implementation details are required. For example, any of the modules 122 may be combined or divided into submodules, subprocesses, or other units of computer code or data as may be required by a particular design or implementation of the computing platform 100.

Domains and Components

In FIG. 1, the domain specifications 142 represent runtime specifications for individual, specially partitioned execution environments that can be executed by the virtualization service 162 during operation of the computing platform 100. As used herein, "domain" may be used to refer to, among other things, a machine-executable unit that can request access to one or more system resources, where such accesses can be controlled by the trusted computing base, e.g., by the policy arbitration subsystem 136. For example, some domains may be embodied as very small, specialized functional units. Additionally, each of the individual security services 250 and/or shared services 220 (FIG. 2) may be embodied as domains, in some cases. Other domains may be embodied as "user domains" through which a person, such as an end user, may interact with the computing platform 100. The domains 260, 270 (FIG. 2) are examples of user domains, as explained further below.

The domain specifications 142 for each domain specify one or more executable modules that are permitted to execute in the domain to request access to one or more shared system resources 210. For example, the domain specifications 142 for each user domain may specify user-level software 144 that is permitted to execute in the user domain. The user-level software 144 includes, for example, an operating system and one or more user-level software applications. Thus, with respect to the domain specifications 142, the term "modules 122" may refer to module or modules (e.g., the user-level software 144) that is associated with the domain specification 142 rather than the specification itself. Each domain specification 142 may define a different "purpose" or "personality" of the computing platform 100, as may be needed or desired, depending on the particular design, purpose, or usage context of the computing platform 100. Moreover, individual components within a domain may separately and/or independently establish different purposes that govern their operation and use in different contexts.

The domains 260, 270 are examples of components that may be provisioned by the provisioning subsystem 134, 254, 650 for use on the computing platform 100 and/or computing system 600. Other examples of components include individual user-level or system-level software applications, firmware, hardware, and/or combinations thereof. In some embodiments, the provisioning subsystem 134, 254, 650 manages component-specific purposes and associated rule sets during operation and use of the components on the computing platform 100, such that the individual components can operate without a priori knowledge of other components' purposes and/or policies/rule sets. In doing so, embodiments of the provisioning subsystem 134, 254, 650 can manage individual component purposes without changing or adversely affecting the enforcement of the purposes of other components. As a result, each component's "purpose" can be enabled while the "anti-purpose" is reliably denied, independently of the purposes of other components of the platform 100. Moreover, some embodiments have the flexibility to enable the component-specific purposes and deny the corresponding anti-purposes in specific contexts as detected by a context aware platform. In these and other ways, it can be said that aspects of the disclosed provisioning subsystem 134, 254, 650 can independently provision and control the behavior and activities of specific components of a device without managing the entire device.

Isolation

Figure 2:
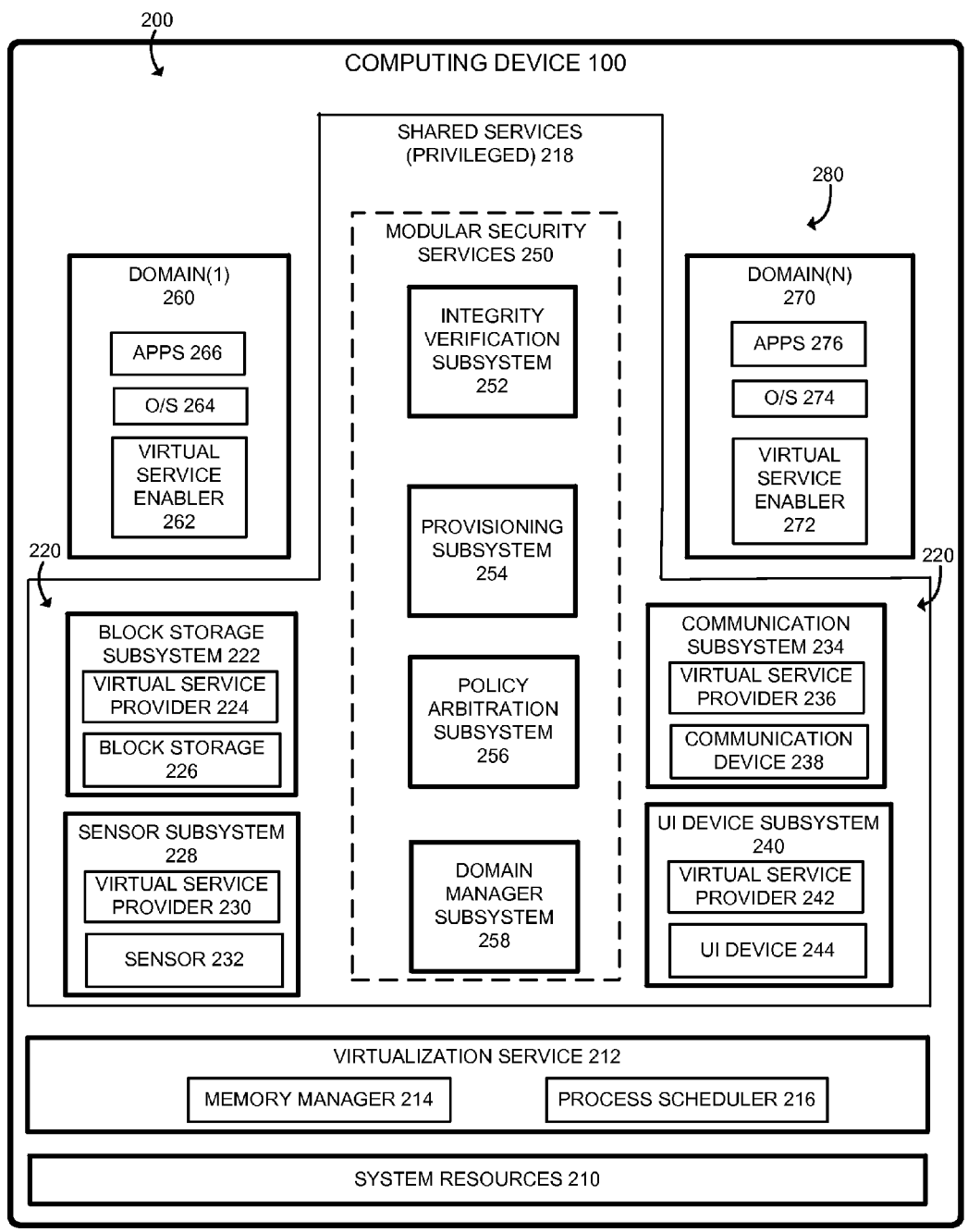
FIG. 2 is a simplified module diagram of at least one embodiment of a virtualized execution environment of the computing device of FIG. 1.

In the illustration of FIG. 2, the other shared services 220 include executing instances of a block storage subsystem 222, a sensor subsystem 228, a communication subsystem 234, and a user interface device subsystem 240. Other system services, such as audit services, encryption services, and/or many others, may be similarly modularized and virtualized, although not specifically shown. The illustrative shared services 218 are both memory-isolated and process-isolated from the domains (which, as illustrated, include at least a domain(1) 260 and a domain(N) 270). Additionally, the domains 260, 270 are both memory-isolated and process-isolated from each other and from the executing instances of the components 212, 218 of the trusted computing base. As such, the illustrative domains 260, 270 are independently executable and independently controllable by the trusted computing base 212, 218 or more specifically, by the virtualization service 212 interacting with the share security services 250 and with the other shared services 220. While only two domains are shown in the illustration, it should be understood that the computing platform 100 may support any number ("N") of domains 260, 270 according to the requirements of a particular design of the computing platform 100.

Virtualization

The illustrative virtualization service 162 is embodied as a type of hypervisor or separation kernel system (e.g., with paravirtualized guest operating systems or with hardware-based virtualization extensions), which is launched by the secure boot logic 118 directly from the firmware 116 rather than by another operating system. For example, the virtualization service 162 may be embodied as a "thin" hypervisor, which may refer to a type of hypervisor that is designed to be "small," in the sense that only the core functions that are needed to establish virtualization on the computing platform 100 are included in the hypervisor. For example, in the illustrative embodiment, many if not all of the shared services 130, 140 are not built into the hypervisor but operate at a level of abstraction above the hypervisor (e.g., as "middleware"). In some embodiments, some components of the shared services 130, 140 are built into the hypervisor (e.g., communication channels which allow the "secure" connection between two components/modules/domains).

In some embodiments, however, the virtualization service 162 may include a more traditional hypervisor, virtual machine manager (VMM), or similar virtualization platform. In some embodiments, the virtualization service 162 may be embodied as a "bare metal" hypervisor, which can execute directly from the system hardware (e.g., by a communication subsystem rather than the secure boot logic 118 or an operating system).

In general, the virtualization service 162 is embodied as a privileged software component that facilitates and manages the virtualization of the shared resources of the computing platform 100. In some embodiments, portions of the virtualization service 162 may be firmware-based rather than software-based. The virtualization service 162 allows the domains 260, 270 (FIG. 2) defined by the domain specifications 142 to execute concurrently or serially on the computing platform 100 in isolated, virtualized execution environments. To increase the strength of the social contract, or for other reasons, some embodiments may utilize a priority-based schedule to ensure triggers and other event-based policy control subsystems are processed first and/or exclusively, e.g., to reduce (or eliminate) the security vulnerability during the small gap between an event triggering and the resulting action to be performed.

As mentioned above, in the illustrative embodiments, the virtualization service 162 is launched directly by the secure boot logic 118 rather than by an operating system. In other embodiments (e.g., traditional system architectures), the virtualization service 162 may be launched by an operating system or by system hardware (e.g., a communication subsystem). In any case, the virtualization service 162 executes in a higher-privileged system mode of the computing platform 100, as opposed to a lesser-privileged mode. As such, in operation, the virtualization service 162 may have substantially full control of the system resources of the computing platform 100. Further, the other components of the trusted computing base (e.g., the shared security services 130 and the other shared services 140) may, when called upon by the virtualization service 162, also have substantially full control of one or more of the system resources of the computing platform 100 with which they are designed to communicate. That is, due to their modularity, the shared services 130, 140 may each be capable of controlling only a specific resource or a specific feature of a resource of the computing platform 100, in some embodiments. In some embodiments, the modularized control of the system resources by the trusted computing base 130, 140, 162 is aided by the use of well-defined communication channels, as described herein.

Referring now to FIG. 2, an embodiment of a modular, virtualized execution environment 200 that may be established on the computing platform 100 is shown. At runtime, an executing instance of the virtualization service 212 interfaces with the system resources 210 (e.g., processor(s) 114, memory 112, 124, I/O subsystem 114, and/or devices 116, 150, 152, 154, 156, 158, 166) through one or more submodules or subprocesses referred to herein as a memory manager 214 and a process scheduler 216 (which are also part of the trusted computing base). The memory manager 214 allocates virtual memory to each of the executing instances of the domains 260, 270 and shared services 218 that corresponds to their respective assigned physical memory (e.g., trusted protected memory 124), so as to implement and maintain the memory isolation technology described herein. The individual instances of the domains 260, 270 and shared services 218, and/or individual executing components thereof, may be referred to herein as "components" 280 for ease of discussion. The process scheduler 216 schedules and regulates communications between the components 280 and the virtualization service 212 over the well-defined communication channels as described herein, so as to implement and maintain the process isolation technology described herein.

Figure 3:
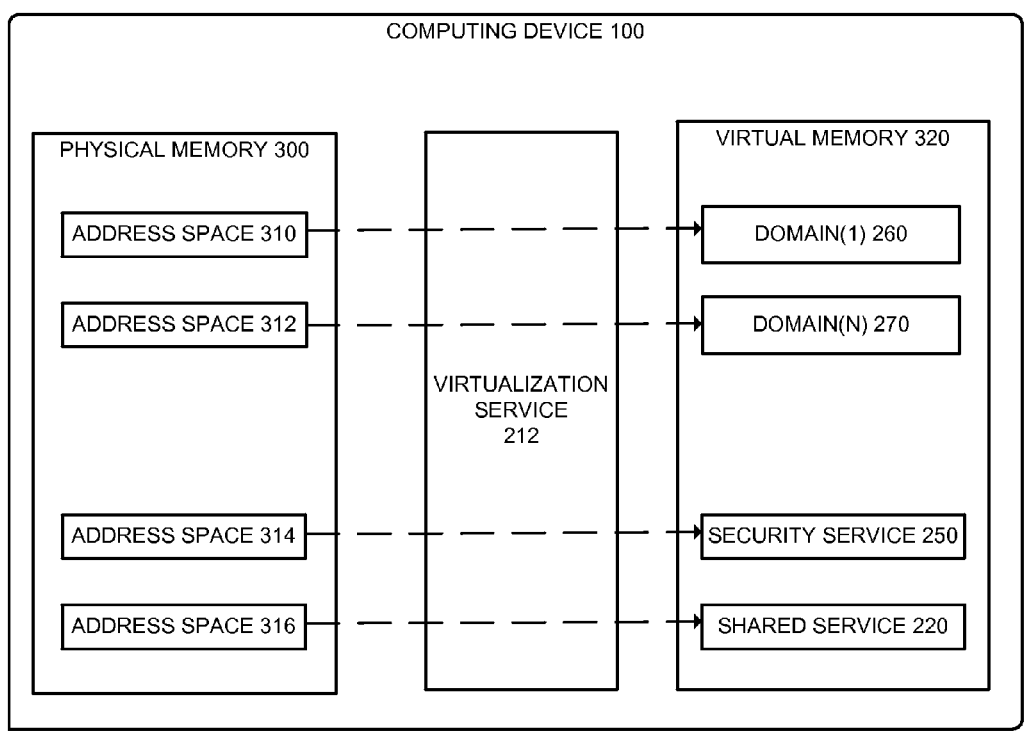
FIG. 3 is a simplified block diagram of a portion of the virtualized execution environment of FIG. 2, illustrating at least one embodiment of a memory isolation scheme as disclosed herein.

Referring now to FIG. 3, an embodiment of the memory isolation features of the illustrative platform 100 is shown. The computing platform 100 includes physical memory 300 (e.g., trusted protected memory 124) which is abstracted to virtual memory 320 by the virtualization service 162. The physical memory 300 includes a number of physical address spaces 310, 312, 314, 316. When the physical memory resources are virtualized by the virtualization service 212 (in conjunction with a modular shared service 220, in some embodiments), the components 280 are each mapped to separate, isolated portions of the physical memory 300. The assignment of physical memory address spaces to components 280 (e.g., shared services 220, security services 250, domains 260, 270) and the assignment of security labels to memory addresses may be performed at the time that the computing platform 100 is created and provisioned (e.g., by an original equipment manufacturer, OEM, or dynamically created, e.g., via a Trusted Platform Management (TPM)), for example. In some embodiments, unique security labels may be associated with each of the memory addresses to facilitate the security features provided by the security services 250. For example, the policy arbitration subsystem 256 may use such security labels to determine whether to permit a domain 260, 270 to perform a read or write memory access to a portion of the physical memory 300.

Figure 4:
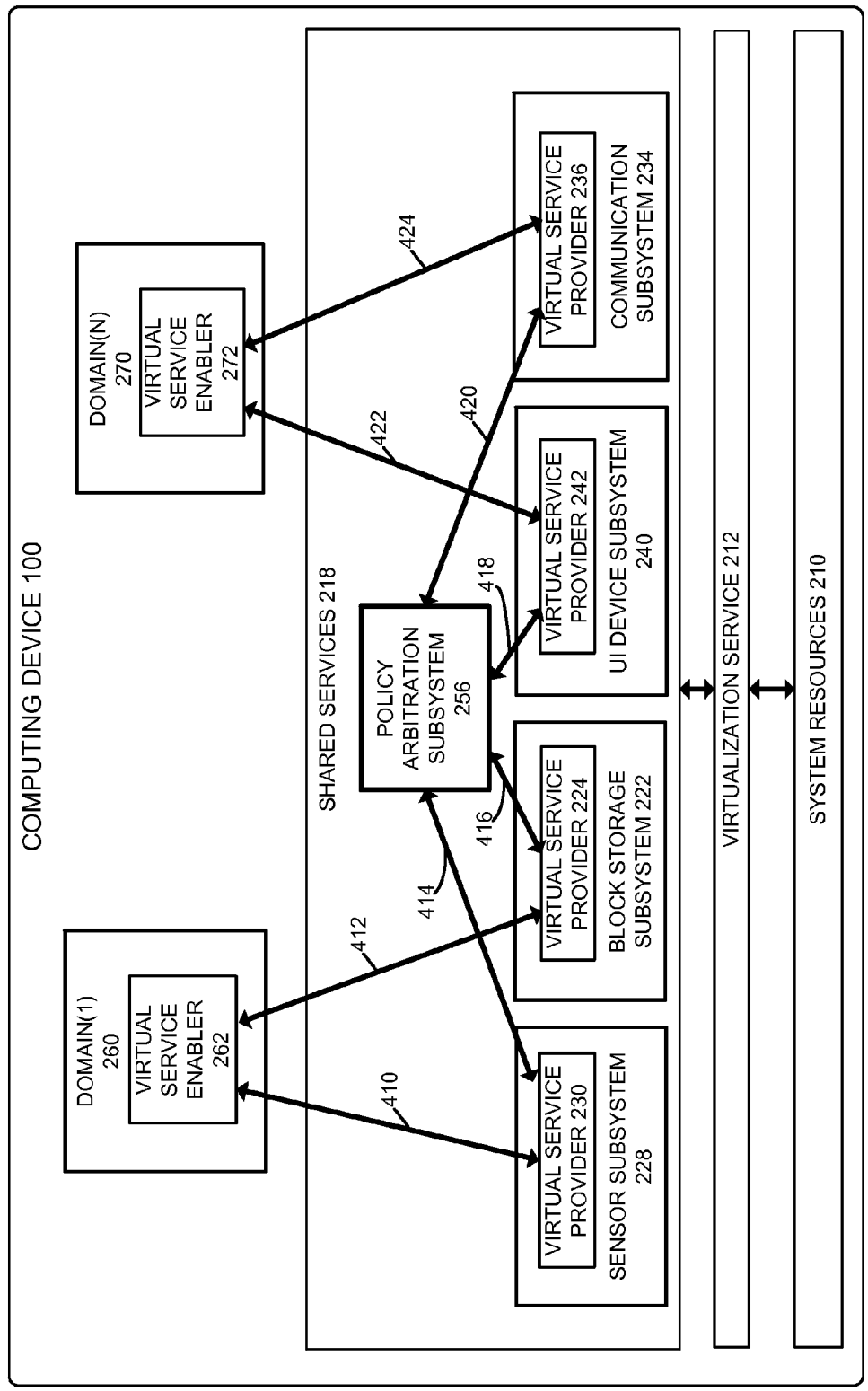
FIG. 4 is a simplified module diagram of an illustrative portion of the virtualized execution environment of FIG. 2, illustrating at least one embodiment of an information flow control scheme as disclosed herein.

Referring now to FIG. 4, a simplified example of the process isolation or "information flow" isolation features of the illustrative platform 100 is shown. FIG. 4 illustrates a MILS-based embodiment comprising architectural components (e.g., components 210, 212, 222, 228, 234, 240, 260, 270), and explicitly defined interactions between the components (e.g., arrows 410, 412, 414, 416, 418, 420, 422, 424, 426, 428), where the presence or absence of an arrow is significant (e.g., the absence of an arrow indicates the absence of a communication channel). The bidirectional arrows 410, 412, 414, 416, 418, 420, 422, 424, 426, 428 each represent a well-defined communication channel that may be unidirectional for some domains 260, 270 or shared services 218 and bidirectional for other domains 260, 270 or shared services 218, depending upon the applicable security policy. As used herein, "well-defined" refers to a communication channel (e.g., any suitable type of wired, wireless, or logical signal path) that only has two possible endpoints (e.g., a source and destination or vice versa) and cannot be modified by any domains 260, 270 or shared services 220. For instance, in some embodiments, hardware restrictions may be provided by a computing device's original hardware design (e.g., an I2C bus layout or intra-bus connects within an SoC). In the context of software virtualization of a communication bus, a privileged controller (e.g., a hypervisor supervising single-service access to an approved hardware resource) can restrict access to a communication channel by different "users" (e.g., domains 260, services 218), rather than designing the device hardware to include additional buses for each special purpose channel (e.g., 1x physical bus per virtualized service). In other words, the well-defined communication channels may be embodied as, for example, hypervisor-supervised secure multiplexed communications over a single bus/physical transport or as multiple independent buses that each ensure singleton security.

Thus, in the embodiment of FIG. 4, each of the domains 260, 270 can only access the system resources 210 through the respective defined communication channels 410, 412, 414, 416, 418, 420, 422, 424, 426, 428 and can only do so through the virtualization service 212 and shared services 218. However, the arrangement shown in FIG. 4 is by no means the only possible arrangement of communication channels. For example, in other embodiments, the domains 260, 270 may communicate with the shared services 220 through the policy arbitration subsystem 256 (e.g., communications may be monitored by the policy arbitration subsystem 256 for policy compliance). Further, it should be understood that similar communication channels exist between components of the modular security services 250 and other shared services 218, even though not explicitly shown in the drawings.

Unique security labels may be programmatically associated with each of the well-defined communication channels so that the components of the trusted computing base can monitor communications that are sent between the different components 280 (e.g., domains 260, 270 and shared services 218) of the computing platform 100. For instance, the policy arbitration subsystem 256 can mediate the communications that occur over the channels 410, 412, 414, 416, 418, 420, 422, 424, 426, 428 according to applicable policies, in accordance with the requirements of the computing platform 100. The assignment of communication channels to the components 280 and the assignment of security labels to communication channels may be performed at the time that the computing platform 100 is designed and/or provisioned (e.g., by an original equipment manufacturer or OEM). For example, the communication channels may be established at or around the time that the memory partitions for the domains 260, 270 and shared services 218 are created.

Some embodiments of the illustrative platform 100 are modularized in the sense that at runtime, each of the running instances of the domains defined by the domain specifications 142, as well as the components of the trusted computing base 130, 140, 162, are both memory-isolated (e.g., data separation) and process-isolated (e.g., information flow control) from one another. To do this, as illustrated by FIG. 3, at installation time, the shared services 220, shared security services 250, domains 260, 270, and the virtualization service 212 are each allocated and assigned to their own address space in physical memory (e.g., block storage). Further, as illustrated by FIG. 4 and described below, only well-defined (e.g., by static firmware-enforced or physical hardware restrictions) communication channels exist between the modules 122 and the virtualization service 212, so that module communications can be tightly controlled according to the requirements of the current configuration of the computing platform 100. As such, in some embodiments, the modular, virtualized architecture described herein represents an application of certain aspects of the MILS architecture mentioned above.

Virtualization Subsystems

The illustrative data storage device 166 is embodied as persistent physical storage, e.g. as a block device, which can read and write data in blocks having a fixed or nominal size (e.g., 512 bytes or a multiple thereof). As such, the data storage 166 may include one or more hard drives, optical drives (e.g., CD- or DVD-ROM), compact flash memory (e.g., memory sticks or memory cards), and/or other such devices.

In some embodiments, the integrity parameters 166 used by the secure boot logic 118 and/or other modules 122 are stored, at least temporarily, in the data storage 166. In some embodiments, portions of the security keys 120, the virtualization service 162 and/or the modules 122 may reside at least temporarily in the data storage 166, as well. Portions of the security keys 120, any of the modules 122, the virtualization service 162, and/or the integrity parameters 166 may be copied to the memory 112 during operation of the computing platform 100, for faster processing or other reasons.

As noted above, the communication subsystem 158 may communicatively couple the computing platform 100 to other computing devices and/or systems by, for example, a cellular network, a local area network, wide area network (e.g., Wi-Fi), personal cloud, virtual personal network (e.g., VPN), enterprise cloud, public cloud, Ethernet, and/or public network such as the Internet. For instance, the provisioning subsystem 134, 254, 650 may be used in the context of "cloud" virtualized services, in some embodiments. The communication subsystem 158 may, alternatively or in addition, enable shorter-range wireless communications between the computing platform 100 and other computing devices, using, for example, BLUETOOTH and/or Near Field Communication (NFC) technology. Accordingly, the communication subsystem 158 may include one or more optical, wired and/or wireless network interface subsystems, cards, adapters, or other devices, as may be needed pursuant to the specifications and/or design of the particular computing system 100.

As shown in FIG. 1, the illustrative communication subsystem 158 includes one or more telephony subsystems 160, which enable the computing platform 100 to provide telecommunications services (e.g., via the baseband processor 126). The telephony subsystem(s) 160 generally include a longer-range wireless transceiver, such as a radio frequency (RF) transceiver, and other associated hardware (e.g., amplifiers, etc.). To provide voice communication services, the telephony subsystem 160 may include an audio subsystem, which may include, for example, an audio CODEC, one or more microphones, and one or more speakers and headphone jacks. In some embodiments, other wireless communication subsystems (e.g., Ethernet, BLUETOOTH, wireless LAN (WLAN), etc.) and/or other services (e.g., GPS) may interface with the baseband processor 126 alternatively or in addition to the applications processor 128.

The computing platform 100 may include other components, sub-components, and devices not illustrated in FIG. 1 for clarity of the description. In general, the components of the computing platform 100 are communicatively coupled as shown in FIG. 1 by electronic signal paths, which may be embodied as any type of wired or wireless signal paths capable of facilitating communication between the respective devices and components.

The software module management service(s) 168 may include, for example, third-party platform management services (e.g., MDM services) or similar services that may be in communication with the computing platform 100 over a network or a variety of different types of networks and communication media, via the communication subsystem 158. Such services 168 may be used to, for example, develop, manage, and implement security policies for the computing platform 100, such as enterprise security policies or mobile device BYOD (bring your own device) policies.

The illustrative domain manager subsystem 258 represents an executing instance of the domain manager subsystem 138, which defines rules and specifications for, and in operation (258) controls and manages, the initialization, execution, activation, and deactivation of the domains 260, 270 globally, e.g., at the computing device level. An illustrative example of the domain manager subsystem 258 is described in more detail in the aforementioned related application, Saidi et al., U.S. Pat. No. 9,495,560.

The domain manager subsystem 258 can switch operation of the computing platform 100 from a highly sensitive domain (e.g., an enterprise domain) to a less-sensitive domain (e.g., a personal/social use domain), or vice versa, in response to a triggering event (e.g., dynamically, or in real time). Such a triggering event may include, for example, the receipt of user input such as tactile or speech input, a gesture, a specific software command, or a user name and password. The detection of certain inputs from one or more of the sensors 152 may also act as a triggering event. For example, if the computing platform 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing platform 100.

Shared Services

Using these technologies, the virtualization service 212 in conjunction with the shared services 218 controls the use and sharing of the various system resources 210 by the domains 260, 270, according to the security policies or requirements of the computing platform 100. For instance, the trusted computing base 212, 218 can mediate software module communications so that the system resources 210 may each be accessed and used by only one of the domains 260, 270 at any given time. As an example, if the user of the computing platform 100 is operating in an "enterprise' user domain and the user is a lawyer recording a deposition or a police officer videotaping a crime scene, the trusted computing base 212, 218 can ensure that, while the enterprise domain is using the device's camera, the camera cannot be accessed by the user's "personal" user domain, e.g., to take pictures or video.

Virtualized software services may be provided by any virtual service provider 224, 230, 236, 242, such as those to which the policy arbitration subsystem 256 can control access, including local software or hardware services (e.g., encryption services, network access, touchscreen display, audio input or output, etc.). At runtime, the virtualization service 212 communicates with the virtual service provider modules 224, 230, 236, 242 that are embedded in the shared services 220, and the virtual service enabler modules 262, 272 that are embedded in the domains 260, 270, respectively. The virtual service providers 224, 230, 236, 242 translate and map the virtualized operations of their respective shared service 220 to its physical counterparts, in order to provide access to a corresponding system resource 210 to, e.g., a domain 260, 270. Similarly, the virtual service enablers 262, 272 translate and map the virtualized operations of their respective domains 260, 270, to enable the domains 260, 270 to utilize (or "consume") system resources to which access is provided by the service providers 224, 230, 236, 242. Together, the virtualization service 212, the modularized virtual service providers 224, 230, 236, 242, and the modularized virtual service enablers 262, 272 provide a level of abstraction between the components 280 (e.g., each of the domains 260, 270 and the shared services 218) and the system resources 210. In other words, the virtualization service 212, the virtual service providers 230, 242, and the virtual service enablers 262, 272 provide (e.g., hardware) abstractions of some or all of the system resources 210, for each of the domains 260, 270 and the shared services 218. As shown by FIG. 4 and described in more detail below, the policy arbitration subsystem 256, alone or in conjunction with other modular security services 250, oversees the communications between the virtual service providers 230, 242, the virtual service enablers 262, 272, and the system resources 210 through the virtualization service 212.

In the example execution environment of FIG. 2, the trusted computing base, which generally operates in the privileged mode of the computing platform 100, includes the executing instance of the virtualization service 212 and the executing instances of the shared services 218. In some embodiments, the privileged shared services 218 are implemented as middleware that interfaces with the virtualization service 212 to control and manage the execution of the various domains 260, 270. The shared services 218 include the executing instances of the modular shared security services 250 and the other shared services 220.

The other shared services 220 communicate with the virtualization service 212 through a respective virtual service provider 224, 230, 236, 242 to provide their respective hardware abstractions in a modular way. For instance, the block storage subsystem 222 virtualizes the I/O communications with block storage devices 226 (such as the firmware 116 or data storage 166). The block storage subsystem 222 thereby acts as a virtual device driver service that can be called upon by other modules of the trusted computing base or by the domains 260, 270, through the virtualization service 212, to move data out of block storage and into random access memory or vice versa. As an example, the integrity verification subsystem 252 may, through the virtualization service 212, communicate with the block storage subsystem 222 to obtain one or more of the integrity parameters 166.

The sensor subsystem 228, the communication subsystem 234 and the user interface device subsystem 240 operate similarly, in that they provide access to their respective system resources 232, 238, 244 through modularized abstractions (e.g., virtual drivers). For example, the domain manager subsystem 258 may obtain sensor data from the sensor subsystem 228 through its interface with the virtualization service 212 and the virtual service provider 230. As another example, the integrity verification subsystem 252 may send integrity data (e.g., an indication of whether a particular software module 122/280 passed or failed an integrity check) to a mobile device management system by interfacing with the virtualization service 212 and the virtual service provider 236. Through this modularization of the system architecture and the isolation techniques described herein, embodiments of the computing platform 100 can confine security issues to the components 280 and/or system resources 210 that may be affected.

In the illustrative execution environment 200, the domains 260, 270 are embodied as user domains that execute as "guests" of the virtualization service 212. That is, the user domains 260, 270 execute in a lower-privileged mode as to not be able to bypass or reconfigure the memory or process isolation provided by the virtualization service 212. As a result, the domains 260, 270 are lesser-privileged execution environments than that provided by the higher-privileged virtualization service 212. The operating systems 264, 274 and software applications 266, 276 executing in each of the domains 260, 270 may be the same or different. For instance, in some embodiments, the domain 260 may execute the ANDROID operating system while the domain 270 may execute the QNX operating system, or the domains 260, 270 may execute different versions of the same operating system. As another example, the domain 260 may execute a self-contained e-mail program and a web browser without a typical operating system, while the domain 270 may execute an electronic medical records system but not e-mail or web browser applications.

The illustrative security services 250 operate independently but in conjunction with one another and with the other shared services 220 and the virtualization service 212, to provide security features for the various domains 260, 270 running on the computing platform 100. For instance, the integrity verification subsystem 252 may be called upon by the virtualization service 212 to check the integrity of a module or component of the computing platform 100, e.g., at load time or at run time, and/or in response to a triggering event. An illustrative example of the integrity verification subsystem 252 is described in the aforementioned Oberg et al., U.S. patent application Ser. No. 13/872,865.

The illustrative provisioning subsystem 254 represents an executing instance of the provisioning subsystem 134, 650, which defines, verifies, and maintains the component configuration for the device and each of the individual domains 260, 270, according to component-specific purposes. An illustrative example of the provisioning subsystem 254 is described in more detail below with reference to FIGS. 5-12.

The illustrative policy arbitration subsystem 256 represents an executing instance of the policy arbitration subsystem 136, which, among other things, defines the protocols for, and in operation (256), regulates the electronic communications between the domains 260, 270 and the virtualization service 212. The policy arbitration subsystem 256, alone or in combination with one or more of the shared services 218, mediates these communications in accordance with security policies that may be specifically applicable to the individual domains 260, 270. An illustrative example of the policy arbitration subsystem 256 is described in the aforementioned Forsberg et al., U.S. patent application Ser. No. 14/052,080.

The methods and processes disclosed herein and illustrated in the drawings are simplified for discussion purposes, but it should be understood that the device 100 and/or the computing system 600 may undertake any of the disclosed methods or processes concurrently or in parallel, e.g., for each of the executing domains 260, 270. For example, the device 100 and/or the computing system 600 may perform an analysis of any policy artifacts 554, domain triggered events 640 and/or event triggers 642 that it receives from any or all of the domains 260, 270, in whatever order or sequence they may occur.

In some embodiments, communication channels similar to those shown in FIG. 4, described above, are defined between the domains 260, 270 and the provisioning subsystem 254 so that communications such as provisioning triggers 516 and purpose enforcement triggers 540 (FIG. 5) can only be sent from the domains 260, 270 to the provisioning subsystem 254 over the defined communication channels, and the triggers 516, 540 cannot be sent from the domains 260, 270 directly to any of the system resources 210 (that is, without going through the trusted computing base). In this way, the configuration of communication channels enables the provisioning subsystem 254 to act as an intermediary to prevent triggers 516, 540, which may have been initiated by potentially untrusted (or assumed untrusted) domains 260, 270, from reaching the system resources 210 without the proper vetting (which may be performed by the provisioning subsystem 254 and/or other components of the trusted computing base).

Beyond Virtualization

Portions of this disclosure describe embodiments of a provisioning subsystem 134, 254, 650 that is adapted for use on a mobile computing platform that has a modular, virtualized system architecture. Some embodiments of modular, virtualized mobile computing platforms can be configured with multiple user-level execution environments, each of which may be tailored for a different use or application of the mobile device. A mobile platform designed with such an architecture can, for example, address security issues that commonly arise when personal mobile devices are used for business purposes or vice versa. Nonetheless, it should be appreciated that the disclosed approach is not limited to virtualized mobile platforms; rather, aspects of the disclosed approach can be used in traditional and/or virtualized platforms to, for example, extend a static, global policy to a more flexible implementation in which multiple independent and potentially conflicting component-specific policies can be mitigated using a variety of techniques.

Componentized Provisioning

Many computer security measures focus on the need to protect sensitive information from unauthorized uses without fully considering the affirmative need to use and share such information in appropriate circumstances. As the number and types of potential security breaches is large and always changing, security measures are frequently over-restrictive, sometimes to the point of defeating the intended use or desired purpose of a computing device. Thus, while such measures may initially give users some confidence in the security of the device, the inability to accomplish desired objectives within the confines of the security protocol can lead to user frustration and even abandonment of the security scheme.

Moreover, the traditional, monolithic architecture of mobile devices typically requires the operating system and preloaded software stack to be provisioned as a whole. For example, mobile devices are typically provisioned with a single operating system and a basic set of software applications, including phone, messaging, calendar, and email services. The end user and/or an authorized third party is not able to re-provision these base services or replace them with their own preferred services without "jailbreaking" or "rooting" the device (which typically voids the manufacturer's warranty). Componentized provisioning techniques as disclosed herein can enable mobile devices and other computing platforms to be selectively provisioned, component by component, according to user-defined component- and/or context-specific purposes. As such, individual components of the traditional monolithic software stacks can be separately and independently provisioned to individual hardware components or a set of hardware components either residing on the device or under its control.

As described in more detail below, embodiments of the provisioning subsystem 134, 254, 650 as disclosed herein can separately and/or independently provision different components 280 of a computing platform (or groups of components) for different purposes, or provision the same component for different purposes in different domains 260, 270. In doing so, embodiments of the provisioning subsystem 134, 254, 650 may provision a component or group of components 280 to be used in accordance with a specified purpose and also expressly provision the component not to be used for a specified or derived "anti-purpose." In some cases, the disclosed provisioning subsystem 134, 254, 650 can receive and implement rules for the use and sharing of specific component resources, and such rules may be context-dependent (e.g., triggered by different operating contexts of the computing platform 100). As used herein, "components" may refer to, among other things, any provisionable operable or executable object or entity that may exist on the computing platform 100. A provisionable component 280 may include, for example, hardware, software, peripheral devices, subsystems, computer programming constructs, and/or others, including sub-components of vertical software stacks, user-installable components, non-user installable components, components that communicate with other devices (e.g., over a network), and components that are controlled or executed by the baseband processor 126. Some provisionable components 280 may create, access, operate on, receive or transmit component resources. As used herein, "component resource" may refer to, among other things, data, instructions, communications, computer programming constructs, or a combination thereof. As an example, a banking application may be a "component" that accesses component resources (e.g., user name, password, biometric identifier, account number, dollar amount, etc.), creates and transmits component resources (e.g., balance inquiry, transfer request, etc.), and receives and processes component resources (e.g., account balance information, transaction confirmation, etc.).

In embodiments in which the computing platform 100 is configured as a "multiple personality" device having multiple independent execution environments or "domains" as described above, the provisioning subsystem 134, 254, 650 as disclosed herein can separately and independently provision each domain 260, 270 and/or separately and independently provision individual components within each domain 260, 270, according to one or more specified purposes. In doing so, the provisioning subsystem 134, 254, 650 may allow permitted and unpermitted uses of components and component resources to be defined and enforced with a high degree of granularity, thereby alleviating the potentially adverse effects of monolithic, over-restrictive security policies and other existing, underspecified, generalized (e.g., monolithic) device provisioning mechanisms. Additionally, individual components can be provisioned differently for different domains 260, 270. For example, a banking application may be provisioned to allow the transfer of sensitive financial information to trusted external recipients in one domain, but the same banking application may be provisioned only to allow the viewing of such information on the provisioned device in another domain, where both domains are installed on the same device. In another representative example, a health application may be provisioned to allow the transfer of sensitive Health Insurance Portability and Accountability Act (HIPAA) information to trusted external recipients in one domain, but the same health application may be provisioned only to allow the viewing of such information on the provisioned device in another domain, where both domains are installed on the same device.

Again referring to FIG. 1, the illustrative provisioning subsystem 134 is embodied as software, firmware, hardware, or a combination thereof, to perform component provisioning services for a computing platform 100. In some embodiments, the provisioning subsystem 134 comprises a "suite" of computer programming constructs (e.g., both on and off-device.) For example, the provisioning subsystem 134 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources (such as shared system resources 210). As noted above, embodiments of the provisioning subsystem 134 or portions thereof may be implemented in or to control hardware components (e.g., as physics-based policies).

While not specifically shown in FIG. 1, it should be understood that portions of the provisioning subsystem 134 can reside on other computing devices or computing systems, in some embodiments as a distributed provisioning system. For example, a portion of the provisioning subsystem 134 may be local to the computing platform 100, while another portion may be distributed across one or more other computing systems or devices that are in communication with the computing platform 100 by one or more electronic communication networks, via the communication subsystem 158, for example. In other embodiments, the provisioning subsystem 134 may be located entirely on the computing platform 100.

Figure 5:
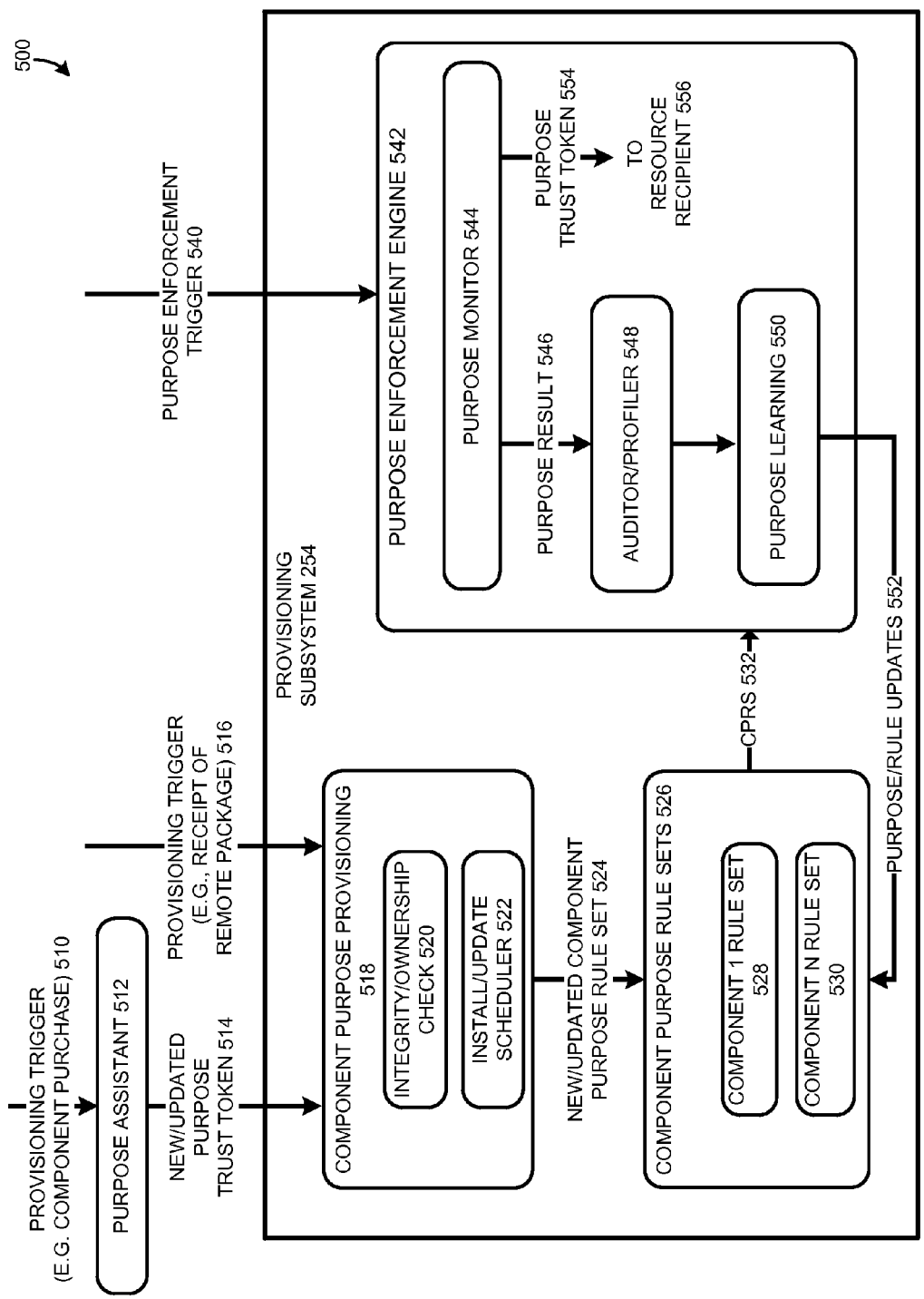
FIG. 5 is a simplified module diagram of at least one embodiment of a provisioning subsystem as disclosed herein.

Referring now to FIG. 5, an embodiment 500 of the illustrative provisioning subsystem 254 includes a number of computerized executable modules that, in some embodiments, may exist within an isolated domain (e.g., APIs, physics-based controls, software applications, RTOS, etc., as mentioned above) and configured to develop and implement component-specific purpose rule sets 526, 654, 910 and component control as described in more detail below. The illustrative provisioning subsystem 254 is embodied as a component purpose provisioning module 518, component purpose rule sets 526, and a purpose enforcement engine 542. In some embodiments, a purpose assistant 512 interacts with the user to create a purpose trust token 514 in response to a provisioning trigger 510 (such as the purchase or downloading of a new or updated component 280). The purpose assistant 512 communicates the purpose trust token 514 to the component purpose provisioning module 518. While shown as a module that is external to the provisioning subsystem 254, it should be understood that the purpose assistant 512 may be incorporated as a part of the provisioning subsystem 254, in some embodiments. An embodiment of the purpose assistant 512 is described in more detail below, with reference to FIGS. 6 and 10.

Operation of the component purpose provisioning module 518 may be initiated or triggered by a provisioning trigger 510, which may result in the generation of a new or updated purpose trust token 514, or by another type of provisioning trigger 516. In general, any event the response to which requires provisioning of a component of the computing platform 100 may operate as a provisioning trigger 510, 516 or may result in the generation of a purpose trust token 514. As used herein, "provision" or "provisioning" may refer to, among other things, the process of installing and configuring a domain or other component 280 on a device in a way that it can be used to handle and share component resources in conformity with the component 280's purpose, which may be implemented as context- and/or resource-specific rules.

As described in more detail below with reference to FIG. 8, purpose trust tokens 514 may be used to authenticate a component's purpose as specified by an "owner" of the component or a component resource handled thereby. As such, purpose trust tokens 514 may embody owner credentials as well as an associated component purpose rule set. In other words, a purpose trust token 514 may embody an owner-specific rule set to govern the use, operation and control of a component in accordance with the owner-specified purpose. For example, a banking application may be provisioned on a device to allow the transfer of sensitive financial information to trusted external recipients in one domain, but the same banking application may be provisioned only to allow the viewing of such information on the provisioned device in another domain, where both domains are installed on the same device. Potential owners of components and component resources include, for example, end users, component providers, mobility policies, MDM services, and recipients of component resources. Provisioning triggers 516 may be similarly authenticated, and may also include automated events, such as the receipt of a new or updated application package identifier (e.g., a Uniform Resource Locator (URL) or Uniform Resource Identifier (URI)), from a remote source (e.g., connected by a network or Uniform Serial Bus (USB) cable, etc.).

In response to a purpose trust token 514 or a provisioning trigger 516 (e.g., at initial boot or as needed at runtime), the component purpose provisioning module 518 undertakes to provision the component 280 associated with the purpose trust token 514 or the provisioning trigger 516, as the case may be, in accordance with its defined purpose. The end result of such provisioning by the component purpose provisioning module 518 is to establish a secure execution environment on the computing platform 100 for the execution of the provisioned component 280, which, during use/execution of the component 280, enables the execution of system operations that are permitted by the component purpose and does not allow the execution of system operations that are not permitted by the component purpose (or which fall within a defined "anti-purpose" of the component 280).

The illustrative component purpose provisioning module 518 includes an integrity/ownership check module 520 and an install/update scheduler module 522. The integrity/ownership check module 520 verifies that a trusted boot of the platform 100 has occurred. To do this, at initial start-up of the platform 100, the integrity/ownership check module 520 verifies the integrity of the components involved in the device boot up to and including the provisioning subsystem 254. At start-up and at runtime (e.g., in response to a provisioning trigger 516), the integrity/ownership check module 520 verifies the integrity of the component 280 (and any or all of the component's specified dependent and related subsystems/shared services/modules/components) before the component 280 is provisioned on the platform 100. An example of a "dependent" subsystem of a provisionable component may be a media application (e.g., NETFLIX, ITUNES, etc.) that specifies in its provisioning configuration that an operating system cipher or software media decoding libraries have not been unaltered from the firmware default configuration (e.g., at boot). In this example, the OS cipher and software media decoding libraries would be the "dependent" components of the media application component. As another example, a banking application may specify certain secure protocols (e.g., Secure Socket Layer (SSL)/Transport Layer Security (TLS)) and/or Certification Authority (CA) trust certifications or security keys). In this example, the SSL/TLS and CA would be the dependent components of the banking application component.

In general, such integrity/ownership checking involves authenticating each component (e.g., each component in the boot sequence and/or the component 280 to be provisioned) and the associated component purpose as having a trusted owner, and verifying that the component has not been altered since its receipt from the trusted owner. To verify that the component 280 has a trusted owner, the integrity/ownership check module 520 may authenticate user credentials (e.g., user name, password, etc.) or security keys (e.g., public keys such as Public Key Infrastructure (PKI) keys and/or others) using, for example, cryptographic techniques. Integrity and ownership checking may be performed according to one or more of the techniques described in Oberg et al., U.S. patent application Ser. No. 13/872,865, for example.

The install/update scheduler 522 analyzes the component purpose rule set 526 associated with the component to be provisioned, verifies that the rule set 526 does not have any unresolvable conflicts with other component purpose rule sets 526 associated with the same component (e.g., component purpose rule sets of other component owners), and initiates provisioning of the component 280 or schedules such provisioning to occur at a later time (e.g., on the next boot), in accordance with its associated rule set. As a result, the new or updated/upgraded component 280 is installed on the platform 100 and its associated component purpose rule set 526 is made accessible to the purpose enforcement engine 542 for runtime enforcement. The new (as in the case of a newly installed component) and updated component purpose rule sets 524 may be added to a "global" compilation of component purpose rule sets 526. The compilation of component purpose rule sets 526 includes the individual component-specific rule sets 528, 530, for each of the "N" (where N is a positive integer) components 280 that are provisioned on the platform 100.

The purpose enforcement engine 542 operates to enforce the component-specific purpose rule sets 526 as they are implicated from time to time by purpose enforcement triggers 540 that occur during operation/use of the platform 100. Purpose enforcement triggers 540 include, for example, requests to access component resources. Such requests may be initiated by other users, software applications, or devices (which may be referred to herein as "resource recipients"). As an example, a mobile device user may initiate, through a mobile banking application, an inquiry as to the current balance of the user's bank account. In this case, the user's balance inquiry acts as a purpose enforcement trigger 540.

The purpose enforcement engine 542 includes a purpose monitor module 544, an auditor/profiler module 548, and a purpose learning module 550. The purpose monitor module 544 monitors operation of the platform 100 and detects purpose enforcement triggers 540. The purpose monitor 544 determines which of the component purpose rule sets 526 (or context- or resource-specific rules thereof) are applicable to the purpose enforcement triggers 540, and evaluates the purpose enforcement triggers 540 in view of the applicable rule set or sets 526. As some components 280 may have multiple owners issuing purpose rule sets 526, in some embodiments, the purpose monitor 544 may reconcile the rule sets of the various owners and determine whether the action requested by the purpose enforcement trigger 540 is permitted by the applicable rule sets, collectively. In other embodiments, the rule sets of the various owners may be compiled and reconciled prior to their entry in the global purpose rule sets 526 (e.g., by the purpose assistant 512). The purpose monitor 544 generates a purpose result 546, in response to each purpose enforcement trigger 540 that implicates one or more of the component purpose rule sets 526. The purpose result 546 may be embodied as a message, instruction, parameter, or data value, for example, that indicates whether the action requested by the purpose enforcement trigger 540 is permitted. If the purpose result 546 is favorable, indicating that the requested action is permitted at least in part, the purpose monitor 544 issues a purpose trust token 554 embodying the purpose result 546 to the resource recipient 556. In the above banking example, the purpose trust token 554 includes a purpose result 546 that indicates, to the banking application or directly to the resource recipient 556, that the request is permitted, and indicates any context- or resource-specific restrictions that are applicable to the request. For example, the purpose result 546 and thus the purpose trust token 554 may stipulate that the account balance information only be provided to the verified requester when the requester is not connected to a public (unsecured) wireless access point (and that such information is not provided when the requester is connected to other wireless access points). Thus, if the user connects to an unsecured wireless network, the purpose trust token 554 issued by the purpose monitor 544 may stipulate that the balance inquiry is to be denied, or may allow the user to override the restriction.

The auditor/profiler module 548 keeps track of purpose enforcement triggers 540 and the associated purpose results 546 determined by the purpose monitor 544, and stores them in memory (e.g., a log file), for auditing and learning. The purpose learning module 550 employs, for example, artificial intelligence based techniques, such as various supervised or unsupervised machine learning techniques, to (e.g., by executing background processes) observe and learn from the user's behavior in response to the purpose results 546. For example, after many instances of observing that a user overrides a particular component purpose rule in a particular operating context of the platform 100, the purpose learning module 550 may propose a modification to the rule, and if approved by the applicable component owners, incorporate corresponding purpose/rule updates 552 into the component purpose rule sets 526.

Figure 6:
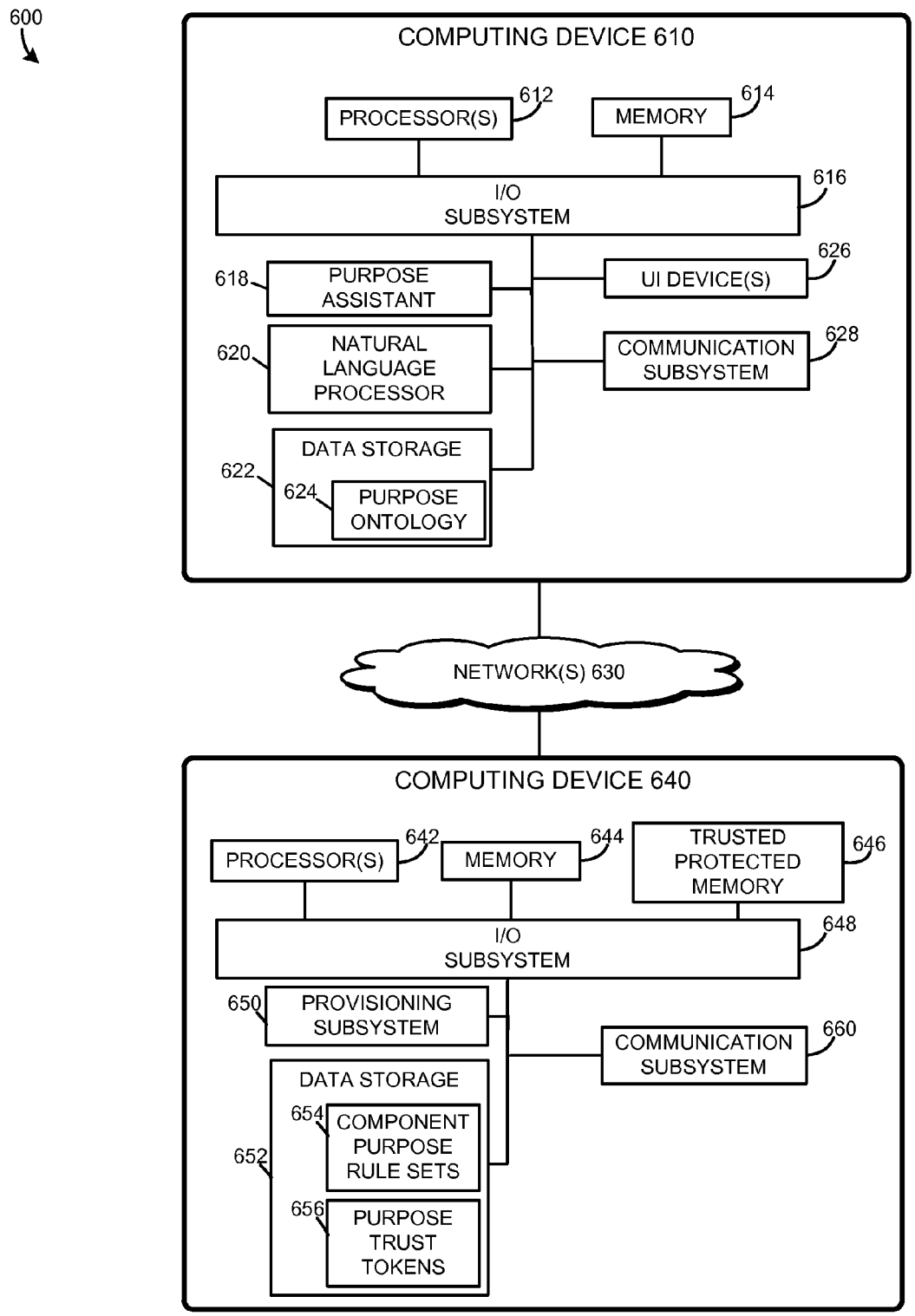
FIG. 6 is a simplified block diagram of at least one embodiment of a networked computing system, including a purpose assistant and a provisioning subsystem as disclosed herein.

Referring now to FIG. 6, an illustrative computing system 600 includes an embodiment 618 of the purpose assistant 512, embodied in a computing device 610, and an embodiment 650 of the provisioning subsystem 134, 254, 650 embodied in another computing device 640. The computing devices 610, 640 are in communication with each other via one or more networks 630. For example, the network(s) 630 may communicatively couple the computing devices 610, 640 to each other and/or to other computing devices and/or systems by, for example, a cellular network, a local area network, wide area network, personal cloud, virtual personal network (VPN), enterprise cloud, public cloud, and/or public network such as the Internet. The illustrative computing devices 610, 640 and the network 630 are depicted in simplified form for ease of discussion. It should be understood that either or both of the computing devices 610, 640 may be configured in a similar manner to the computing platform 100 and have one or more similar components thereto. For example, the computing device 610 and/or the computing device 640 may include all or a subset of the components of the computing platform 100. In general, the components of the computing system 600 having similar or identical names to components shown in FIG. 1 and/or described above may be embodied in a similar fashion to the corresponding components described above. As such, reference is made here to the foregoing description and such description is not repeated here.

In the computing system 600, the purpose assistant 618 is in communication with a natural language processor 620, which applies a purpose ontology 624 to natural language purpose input of a user (e.g., a component or resource owner) to derive therefrom one or more policies, purposes, and/or anti-purposes to be implemented on the computing device 640 by the provisioning subsystem 650 in connection with the provisioning of a component 280 for use on the computing device 640. That is, the provisioning subsystem 650 is extended by the purpose assistant 618 to facilitate purpose/anti-purpose generation by one or more stakeholders (e.g., end users, component owners, component providers, etc.). Similarly, signed purpose contexts, which in some embodiments may be formulated as signed purpose tokens, can be transferred across networks and heterogeneous computing systems/devices to, for example, provide assurance that a purpose provisioned task/event has been verified/authorized by an active purpose enforcement engine for a given user and resource. In the banking example, a mobile user could be "pre-authorized" by a bank to transfer small increments of funds (e.g., up to a percentage of equity in their authorized account by a bank) to another mobile user/party without requiring an active authorization from a bank or credit issuer. Such a form of secure "pre-authorization" may allow for transfers to occur even offline (e.g., without the two parties being connected to a banking network, point of service (PoS) terminal, or the Internet).

In different embodiments, the purpose assistant 618 may have a number of different front end interfaces which will help gather component purpose context which will be used to create the component purpose rule sets 654. As such, the purpose assistant 618 may include a natural language parser, a step-by-step wizard-based solution, or direct definitions, for example. In any case, the purpose assistant 618 is configured to process the high-level, descriptive details about component purposes and policy requirements, derive the component purpose and anti-purpose, and then convert these into a component purpose rule set 654. The context provided by using high-level descriptions of the component purpose allow the component purpose rule sets 654 to be applied more flexibly in different operating contexts of the device 640.

For example, in some embodiments, the purpose assistant 618 is embodied as (or as a component of) a "virtual personal assistant," which can engage a person in a natural language dialog to achieve the goal of developing a component purpose rule set for a component to be provisioned on the computing device 640. Such a virtual personal assistant may be embodied as a computerized application that employs natural language processing (NLP) and/or natural language understanding (NLU) techniques to interpret natural language input (e.g., conversational input or dialog, including spoken natural language dialog) received by one or more user interface devices 626 (e.g., a microphone, keypad, etc.), and generate a machine-readable semantic representation of the user's intended meaning of the natural language input. The machine-readable semantic representation of the user's natural language policy or purpose statement may be stored as a component purpose rule set 654, which may be embodied as machine-executable rules and/or computer program logic statements, for example.

Some aspects of virtual personal assistants, all or portions of which may be used in connection with or to implement one or more aspects of the purpose assistant 618, are described in at least the following patent applications of SRI International: Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" and Kalns, et al., U.S. patent application Ser. Nos. 13/891,858 and 13/891,864, both filed May 10, 2013, both entitled, "Rapid Development of Virtual Personal Assistant Applications."

Briefly, the conversational (e.g., unstructured) natural language policy or purpose inputs are received and processed by, for example, a user intent interpreter module of the natural language processor 620 or the purpose assistant 618, which analyzes the input and formulates therefrom a likely intended goal or objective of the user with regard to establishing a purpose or policy for a component to be provisioned on the computing device 640. Such a goal or objective may be referred to as a "user intent." In some embodiments, the user intent may be formulated as an intermediate structured representation of the conversational natural language input. For example, if the natural language policy statement includes the phrase, "Only share account information when user is connected to a secure wireless network," the corresponding user intent may be formulated as, e.g., a combination of structured statements such as "ShareData(Account_Info, Secure_WAP)" and "ProtectData(Account_Info, All_Other_WAP)." The purpose assistant 618 analyzes the natural language input and/or the user intent as needed, and based on its analysis, executes one or more "task flows" (e.g., machine-executable routines) to generate the component-specific purpose rule sets 654. For example, the "ShareData (Account_Info, Secure_WAP)" and "ProtectData(Account_Info, All_Other_WAP)" statements may be translated to a series of lower-level machine-executable instructions that can be executed by the provisioning subsystem 650. Additionally, the purpose assistant 618 may generate purpose trust tokens 656 for each of the component purpose rule sets 654 as described herein. The component purpose rule sets 654 and the purpose trust tokens 656 may be stored in the data storage 652.

Where spoken natural language is used to input a policy or purpose statement, the user intent interpreter module analyzes the words and/or phrases produced by, e.g., an automated speech recognition (ASR) system, which, generally converts speech to the corresponding text (e.g., words and phrases). In this case, the user intent interpreter module may apply, for example, a rule-based parser and/or a statistical parser to determine, based on the verbal context, the likely intended meaning of spoken words or phrases that have multiple possible definitions (e.g., the user may have intended the word "net" to mean "Internet" or "subnet," or something else, depending on the context). An illustrative example of a natural language understanding component that may be used in connection with or as a part of the user intent interpreter module is the SRI Language Modeling Toolkit, available from SRI International. In some embodiments, the user intent interpreter module combines the likely intended meaning, goal, and/or objective derived from the natural language input as determined with any multi-modal inputs (e.g., GPS location, etc.) and the policy reasoner 618 synthesizes the combination of natural language inputs and other multi-modal inputs to generate the component purpose rule sets 654.

The purpose ontology 624 is embodied as, for example, a database or knowledge base, which defines semantic relationships between various natural language terminology and their machine-readable counterparts. For example, the policy ontology 624 may define "checking account" as referring to a specific banking account number of a specific user, or may define "my house" as referring to a specific wireless access point, or may define "all social media" as a list of social media sites/services (e.g., FACEBOOK, TWITTER, LINKEDIN, TUMBLR, etc.). In this way, the purpose ontology 624 facilitates not only purpose creation but also purpose maintenance, in that changes made to the ontology 624 can be automatically propagated to component purpose rule sets 654 that reference the ontology 624. Moreover, platform-specific configuration details can be reflected in the ontology 624, thereby allowing just the ontology 624, and not the individual component rule sets 654, to be updated in response to platform, operating system, or software upgrades.

Figure 7B:
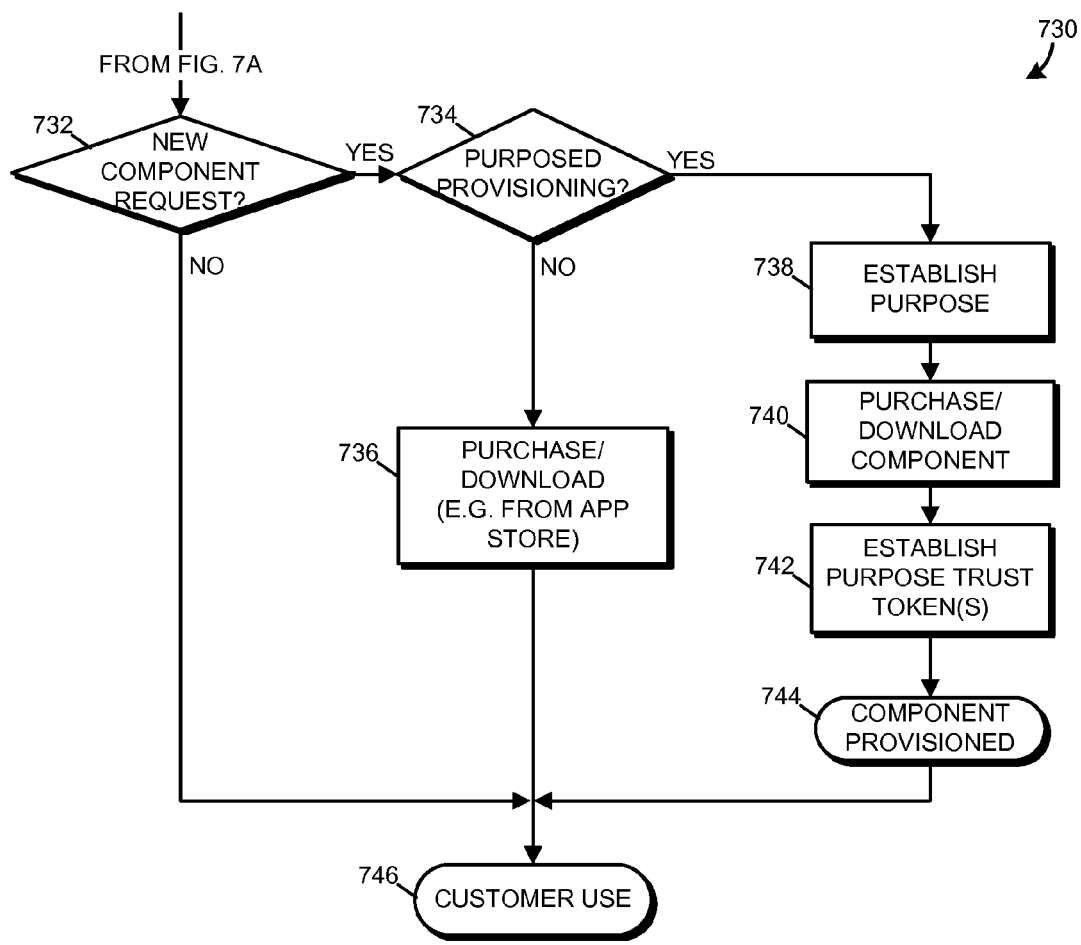
Figure 7D:
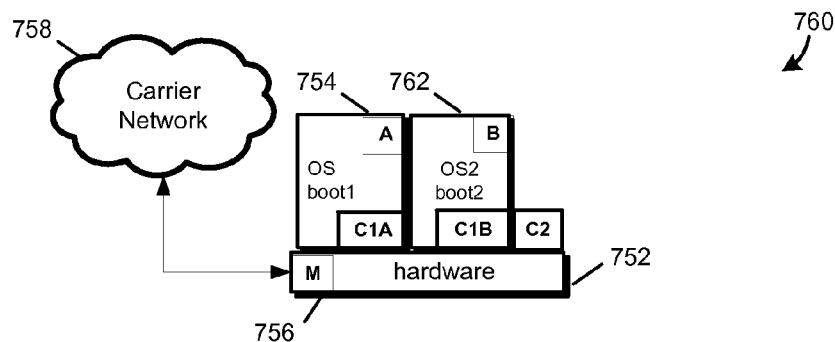

Referring now to FIGS. 7A-7B, an illustrative method 700, 730 for provisioning an electronic device (e.g., platform 100, device 610 and/or device 640) is shown. FIGS. 7C-7D illustrate simplified depictions 750, 760 of the electronic device 100, 610, 640 during different stages of the provisioning method of FIGS. 7A-7B. The method 700, 730 may be embodied as computerized programs, routines, logic and/or instructions executed by the computing platform 100 or by the computing system 600 (by the provisioning subsystem 650, for example). At block 710, the method 700 is initiated by the manufacture of the electronic device (e.g., a mobile/wearable/portable embodiment of the computing platform 100). In FIG. 7C, the status of the device is represented by the single block 752 (e.g., hardware only, with nothing installed). The device is initially provisioned (e.g., by the original equipment manufacturer (OEM) or telecommunications carrier) with a hardware security key (or set of keys) 120, boot extensions for the integrity checking 132 and provisioning 134 subsystems, and the initial software stack (e.g., loaded by the OEM/carrier). At this stage, components 754 (e.g., bootloader, operating system, native applications) are provisioned on the device.

At block 714, the platform 100 receives an initial provisioning trigger, which may be the purchase of the electronic device by a customer, for example. The initial provisioning trigger may be as simple as a power on of the device or the input/receipt of user credentials. At block 716, the platform/system 100, 600 determines whether the device is enabled for cellular telecommunications services. If the device is not enabled for cellular service, the method 700 proceeds to block 728, where user customization of the device is initiated. If the device is cellular enabled, the device is configured according to a selected carrier and/or cellular plan, at block 718. The carrier and/or cellular plan may be selected by the end user or an enterprise (e.g., a corporate administrator), for example. At block 720, the platform/system 100, 600 determines whether the device is to be provisioned with a new phone number or with an existing phone number. If the device is to be provisioned with a new phone number, the new phone number is obtained at block 722 (e.g., from the carrier), and at block 724 the device is provisioned for use with the selected carrier's cellular network. If the device is not provisioned with a new phone number, the method 700 proceeds to block 724 directly. Once the device has been provisioned for access to the carrier's cellular network, the device's cellular provisioning is complete, at block 726, and the platform/system 100, 600 proceeds to user customization of the device at block 728. In FIG. 7C, the status of the device now includes mobility (e.g. cellular service) 756 and a connection to a carrier network 758. User customization may include, for example, establishing the end user's preferred email service and email address, wireless networks, etc., as well as any other customizations (e.g., settings, preferences).

Referring now to FIG. 7B, the method 730 follows the method 700, in the illustrated embodiment. In other embodiments, the method 730 may operate in conjunction with or parallel to the method 700. For example, in some embodiments, the carrier set up (block 718) and/or carrier network provisioning (block 724) may be purpose provisioned according to the method 730. That is, in some embodiments, the method 700, 730 enables aspects of the cellular configuration of the device to be provisioned according to user-specified purposes as disclosed herein. At block 732, the platform/system 100, 600 determines whether a provisioning trigger in the form of a new component request has been received. The new component request may take the form of a request to download a new component or install a new component found/scheduled in persistent storage/cache (as may be the case in device implementations that schedule application, operating system, or other firmware updates based on the presence of a new or updated component in a defined storage location). For example, if a new component request is not received, the device begins or continues normal customer use at block 746. If a new component request is detected, the platform/system 100, 600 determines whether the component is eligible for purposed provisioning, at block 734. To do this, the platform/system 100, 600 may determine whether the new component has an associated purpose trust token. If the component is not to be purpose provisioned, the platform/system 100, 600 proceeds with the purchase or download (e.g., from an app store or app market) of the component (block 736) and normal customer use (block 746). In FIG. 7D, the device now includes multiple separately provisioned domains 754, 762 and other independently provisioned components C1A, C1B, and C2, where C1A represents a purposed provisioning of a component C1 for use within the domain A, C1B represents a different purposed provisioning of the same component C2 for use with in the domain B, and C2 represents another purpose provisioned component outside of the domains A and B.

If the new component is to be purpose provisioned, the platform/system 100, 600 proceeds to execute computer program logic to define the component-specific purpose (block 738) (e.g., via the purpose assistant 512), purchase and/or download the component (block 740), establish the purpose trust token(s) associated with the component and the component stakeholder(s) (block 742) for use by, e.g., the purpose enforcement engine 542, complete the component purpose provisioning (block 744), and begin or resume normal customer use (block 746).

Figure 8:
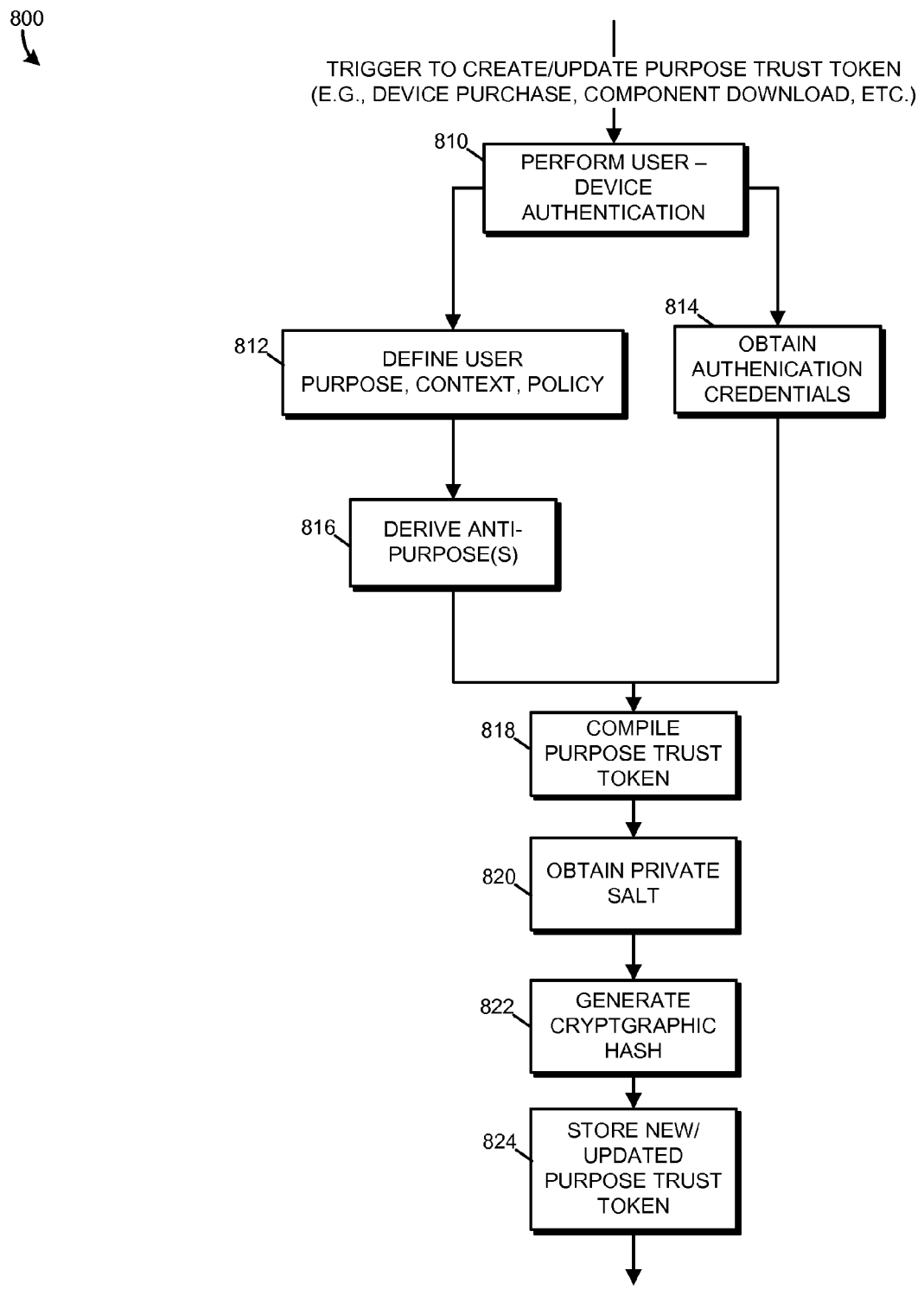
FIG. 8 is a simplified flow diagram of at least one embodiment of a method for creating or updating a purpose trust token as disclosed herein.

Referring now to FIG. 8, an illustrative method 800 for creating or updating a purpose trust token is shown. The method 800 may be embodied as computerized programs, routines, logic and/or instructions executed by the computing platform 100 or by the computing system 600 (by the purpose assistant 618, for example). At block 810, the method 800 is initiated by a trigger to create or update a purpose trust token (e.g., by the purchase of the device, by a component download, etc.). As discussed above, the purpose trust token may be embodied as an encrypted or otherwise secured element comprised of authenticated user credentials and user-defined component-specific purposes and policies (e.g., a component purpose rule set 526). In other words, the purpose trust token provides a trusted indication of the permitted and unpermitted users of its associated component in various operating contexts of the device. At block 810, the platform/system 100, 600 authenticates the user to the device. To do this, the platform/system 100, 600 may verify a user name and password, fingerprint or other biometric identifier, or use other authentication techniques. At block 812, the platform/system 100, 600 defines the component-specific purpose and any context-specific rules and policies related thereto. To do this, the platform may interact with the user using, for example the purpose assistant 512. At block 814, the platform/system 100, 600 obtains the user authentication credentials to be incorporated into the purpose trust token to validate the purpose-based rules and policies as authentic to the user. These credentials 814 may be unique or specific to the purpose context (trust token) or may be more globally defined, e.g., as a global/common user to device authentication 810. In some instances, the user may not know the credentials, as they may be securely transferred to the device and stored by an automated process. In the banking example, a bank's automated teller machine (ATM) may authorize a user's device as well as the bank application component provisioned thereon via a unique code sent via, e.g., NFC, RFID (radio frequency identification), barcode, etc.

At block 816, the platform/system 100, 600 derives the anti-purpose(s) associated with the purpose obtained at block 812. To do this, the platform/system 100, 600 may refer to pre-established relationships between defined purposes and anti-purposes, which may be stored in, for example, a lookup table, database, or the purpose ontology 624. At block 818, the platform/system 100, 600 compiles the purpose trust token from the defined purpose, context(s), policies, anti-purpose(s), and authentication credentials. As used herein, "context" may refer to, among other things, the current calendar date, the current time, the current geographic location, nearby wireless access points, cell tower locations, and/or other indicators of the current operating context of the platform/system 100, 600, as may be detected by sensors and/or other context-detecting mechanisms of the platform/system 100, 600. Thus, in some embodiments, the purpose trust token may include, for example, a date/time stamp and/or other context indicators.

At block 820, the platform/system 100, 600 obtains a user-specific private salt (such as the user-supplied answer to a security question or some other user-supplied data). At block 822, the platform/system 100, 600 executes a cryptographic hash function (e.g., a Secure Hash Algorithm) using the private salt and the purpose trust token as inputs. The output of the cryptographic hash function is stored as the new or updated purpose trust token, in a secure form (e.g. not easily derived or ascertained), at block 824.

Figure 9:
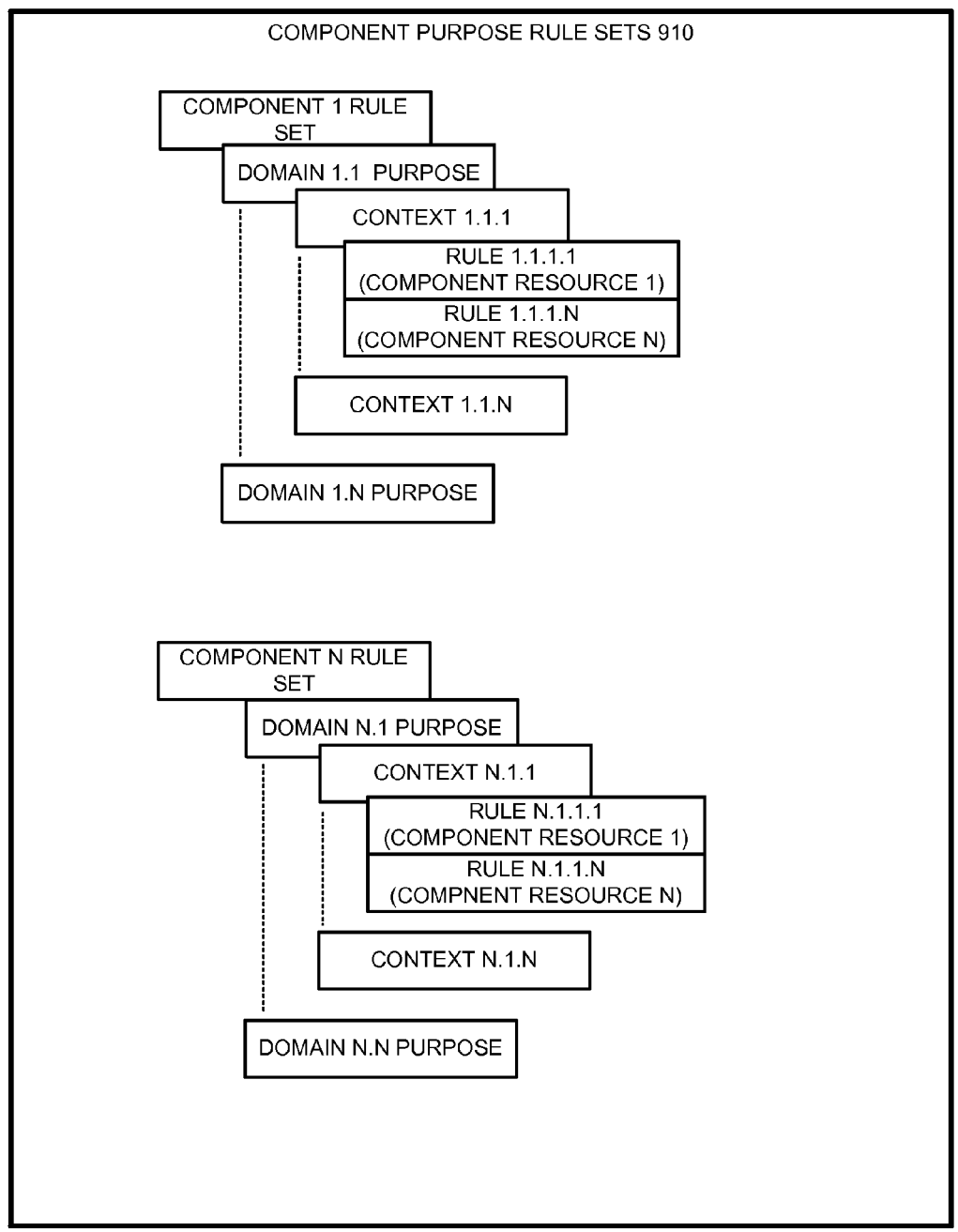
FIG. 9 is a simplified illustration of at least one embodiment of component purpose rule sets as disclosed herein.
Figure 10:
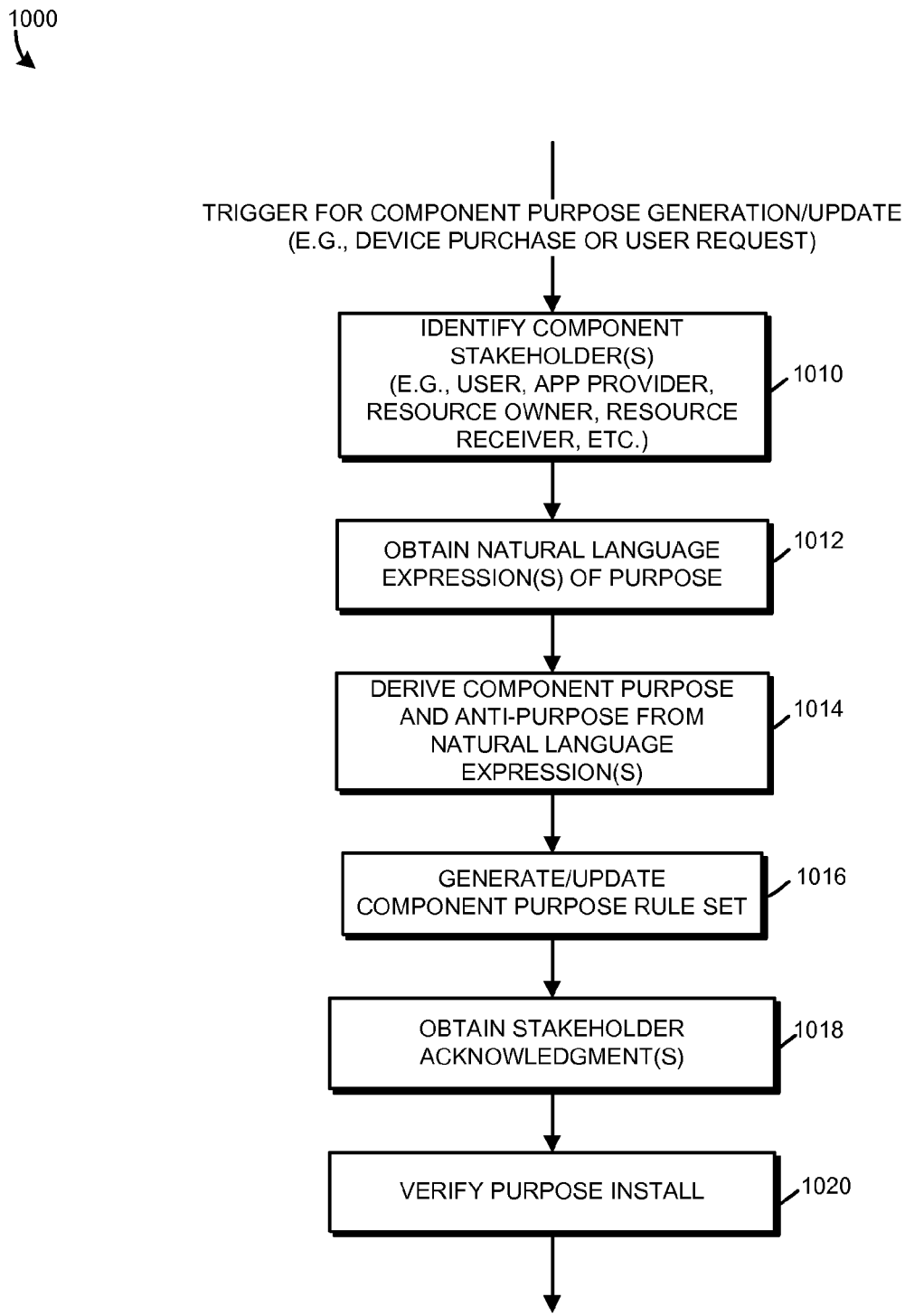
FIG. 10 is a simplified flow diagram of at least one embodiment of a method for creating or updating a component purpose as disclosed herein.

Referring now to FIG. 9, a simplified illustration 900 of component purpose rule sets 910 is shown. In the illustrative example, a separate component rule set is defined for each of N provisionable components of the platform/system 100, 600. As shown, each component rule set may have a different set of rules for each domain 260, 270 in which the component is provisioned. Further, each component rule set may have different rules that apply during different operating contexts of the platform/system 100, 600. Moreover, each component rule set may have different rules that apply to different component resources involve in the use or execution of the component. In this way, the component purpose rule sets 910 allow for finer granularity and context-dependency of restrictions on the use of component resources, and for the release of restrictions when the conditions/context giving rise to the restrictions cease to exist. The component purpose rule sets 910 may be embodied as, for example computer readable instructions, directives, or statements, which may be developed by the purpose assistant 618 and processed by the provisioning subsystem 254, 650 as described above. Referring now to FIG. 10, an illustrative method 1000 for creating or updating a component purpose is shown. The method 1000 may be embodied as computerized programs, routines, logic and/or instructions executed by the computing platform/system 100, 600 or by the computing device 610 (by the purpose assistant 618, for example). As described herein, the creation or updating of a component purpose may involve input from or negotiation among multiple stakeholders, such as the component owner and end user. Thus, in some embodiments, a component purpose represents an agreement among multiple parties as to how a component may be used by the end user and as to how the end user's component resources (e.g., personal/private data) may be used and shared by the component. However, certain types of purposes may be open-ended in that resource recipients 556 are not yet defined. Such may be the case where a component owner defines a purpose for use of the component on a device, but the component or the device is not yet configured for a specific end user. For instance, the component resources may include bank funds, personal IDs, social media IDs (e.g. FACEBOOK, LINKEDIN, SKYPE, etc. user IDs), and related private information that the resource/component owner may want to share on a limited basis in the future but with a common set of purpose conditions/restrictions. That is to say that some purpose conditions/restrictions may be applicable more generically to multiple different component resources, in some embodiments. For example, multiple different social media resources may have a common set of purpose conditions/restrictions (e.g., sharing of a user ID, but not a "friends," "followers," or "contacts" list; and not the user's date of birth, contact info, pictures, etc.). At block 1010, the method 1000 is initiated by the detection of an electronic communication comprising a request or trigger to generate a new or updated component-specific purpose for a component provisioned or to be provisioned on the platform 100. For example, the method 1000 may be initiated by the purchase of an electronic device embodying the platform/system 100, 600, a user request (e.g., the purchaser or a system administrator), etc. At block 1010, the platform/system 100, 600 identifies the component stakeholders (e.g., the end user, component provider, device manufacturer, resource receivers, etc.). At block 1012, the platform 100 or computing system 600 (e.g., the computing device 610 operating the purpose assistant 618), obtains a natural language expression or expressions (from the various stakeholders) of the component-specific purpose. In some embodiments, the component-specific purpose contains a number of different elements that identify: the applicable provisionable components (in cases where a purpose spans multiple components), the applicable component resource identifiers (e.g. bank account numbers, etc.), the applicable resource owners (which may be tracked by publicly shared keys), the applicable resource receivers (which may receive purpose-approved resources but may not directly submit new purposes for the specified resources), and the purpose criteria and rule matching result/actions (e.g., the criteria for determining whether a purpose matches a purpose enforcement trigger event and the action to be taken if a match occurs).

At block 1014, the platform 100 or computing system 600 derives the component-specific purpose and anti-purpose from the received natural language expression(s). To derive the purpose and anti-purpose, the platform/device 100, 610 may apply the purpose ontology 624 to, for example, determine relationships between the stated purpose and purpose/policy/anti-purpose information contained in or referenced by the purpose ontology 624 and/or an associated knowledge base (which may include, for example, searchable database tables populated with specific data values, rules, and/or computer instructions that relate to natural language statements) and thereby map elements of the natural language expression to elements of the ontology 624 and/or associated knowledge base.

Figure 11:
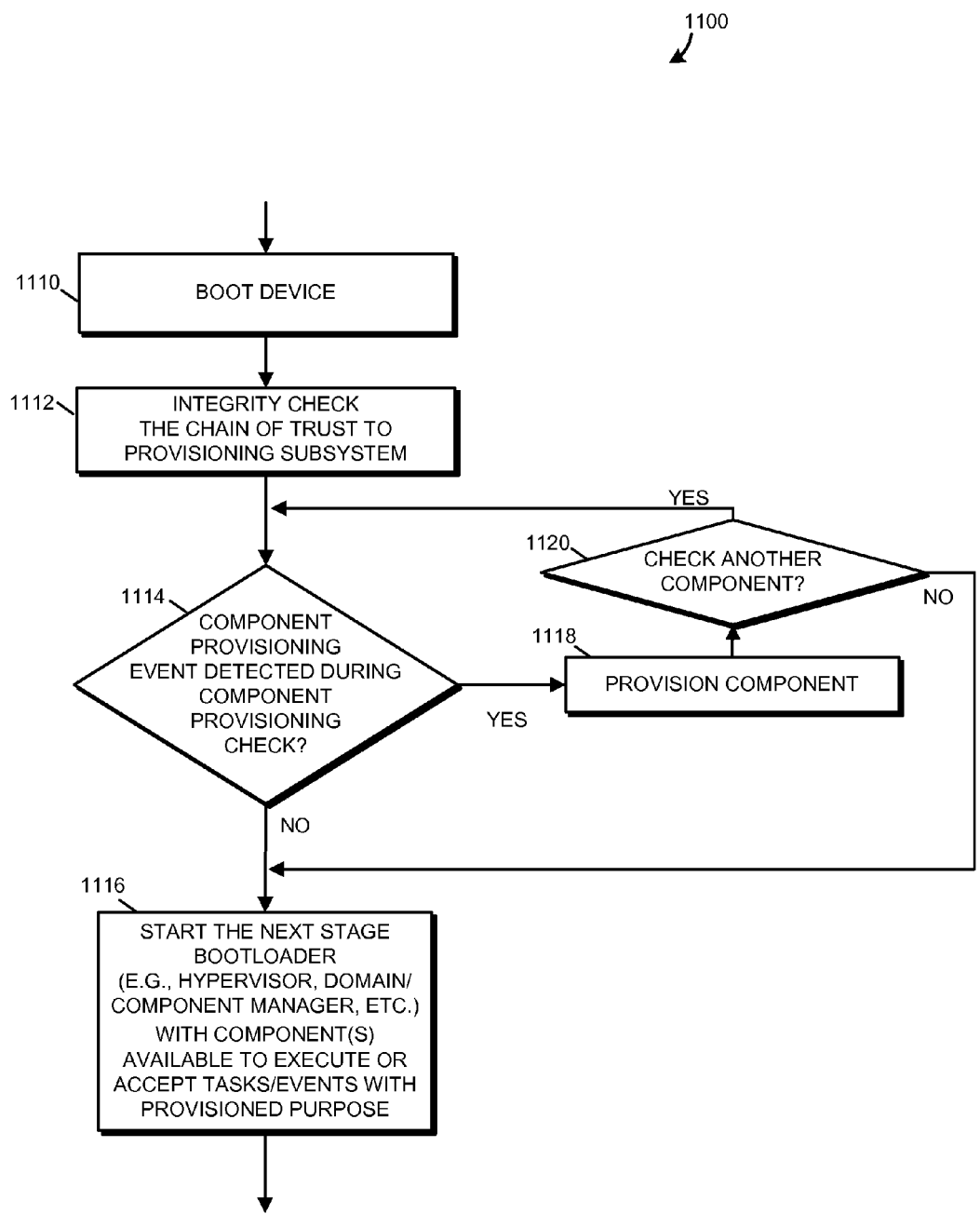
FIG. 11 is a simplified flow diagram of at least one embodiment of a method for booting an electronic device including the provisioning subsystem as disclosed herein.

At block 1016, the platform/device 100, 610 generates or updates (as the case may be) the component purpose rule set, which, as discussed above, may include a number of different component-, resource- and/or context-specific rules. To do this, the platform/device 100, 610 may again refer to the purpose ontology 624 and/or an associated knowledge base to map the derived purpose and anti-purpose to their corresponding machine-readable semantic representations, instructions, and/or data values. At block 1018, the platform/device 100, 610 obtains acknowledgements from the identified stakeholders indicating approval of the new or updated component purpose rule set. Digital signatures or other methods may be used to authenticate and verify stakeholder approval. The new or updated component purpose rule set is then stored in a suitable data structure, e.g. a searchable database, in persistent storage, such as the data storage 652, and shared with all relevant interested parties (e.g., resource recipients, which may include the stakeholders). At block 1020, the platform/device 100, 610 verifies that the component purpose (implemented as a component purpose rule set) is compatible with other component purposes, and has been successfully installed on the platform/device 100, 610. In some cases, block 1020 is executed to confirm that, in the event that a time elapse occurs between the component purpose rule set generation and the completion of stakeholder acknowledgements, the new component purpose is still valid (e.g., the new purpose does not conflict with any purpose rule sets installed or updated during the time elapse). Referring now to FIG. 11, an illustrative method 1100 for booting an electronic device including a provisioning subsystem 134, 254, 650 as disclosed herein is shown. The method 1100 may be embodied as computerized programs, routines, logic and/or instructions executed by the computing platform 100 or by the computing system 600 (by the virtualization service 162, 212 and/or other components of the trusted computing base, for example). At block 1110, the platform/system 100, 600 boots (e.g., in response to a power on event). As part of the boot process, the virtualization service 162, 212 (e.g., hypervisor) or pre-boot loader loads the provisioning subsystem 134, 254, 650 into memory. To do this, the provisioning subsystem 134, 254, 650 may be downloaded (e.g., from a networked server computer in "the cloud"), or a boot image may be loaded into memory from block storage, for example. At block 1112, the platform/system 100, 600 performs an integrity verification check on the chain of trust from the bootloader to the provisioning subsystem 134, 254, 254, as described above. At block 1114, the platform/system 100, 600 executes a provisioning check to see if any components need to be provisioned on the platform/system 100, 600, e.g., for a new domain or purpose. That is, if a component is already installed on the device, it may not need to be provisioned. However, the component may need to be purpose provisioned (e.g., as an extension of a typical 'user customization 728'), e.g., for a new domain or user. For example, an already installed email application may be purpose provisioned as disclosed herein for use in a personal domain with a user's GMAIL account and also separately purpose provisioned for use in an enterprise domain with an employer-issued email account.

If the platform/system 100, 600 detects a provisioning event (e.g., that there is a provisionable component needing to be provisioned, as indicated by, for example, a provisioning trigger 516 or purpose trust token 514), the method proceeds to block 1118. In some embodiments, the domain manager subsystem 138, 258 may determine active domains 260, 270 and initiate provisioning of a domain that is available to run on the platform/system 100, 600 (e.g., certain "default" domains). If there are no components that need to be provisioned, the platform/system 100, 600 proceeds to block 1116. For example, the platform/system 100, 600 can start (e.g., launches, initializes, and/or begins execution of) the next stage bootloader (e.g., hypervisor, domain/component manager, etc.) or the component (per operating system and component dependencies), at block 1116. For example, in some embodiments, a component may be an application operating system, subsystem, etc. that is arranged to start in a system dependent order or as needed on demand.

If it is determined at block 1114 that a component needs to be provisioned, the platform/device 100, 640 determines the provisioning configuration and purpose provisions the component for use on the platform/device 100,640 using the techniques described herein, at block 1118. At block 1120, the platform/system 100, 600 checks to see if additional component provisioning needs to be performed. If there is additional provisioning checking to be performed, the method 1100 returns to block 1114. If no other components need to be checked for provisioning, the method 1100 proceeds to block 1116. Once provisioning is complete, the provisioned components are available to execute and/or accept or issue tasks/events in accordance with their provisioned purpose.

Figure 12:
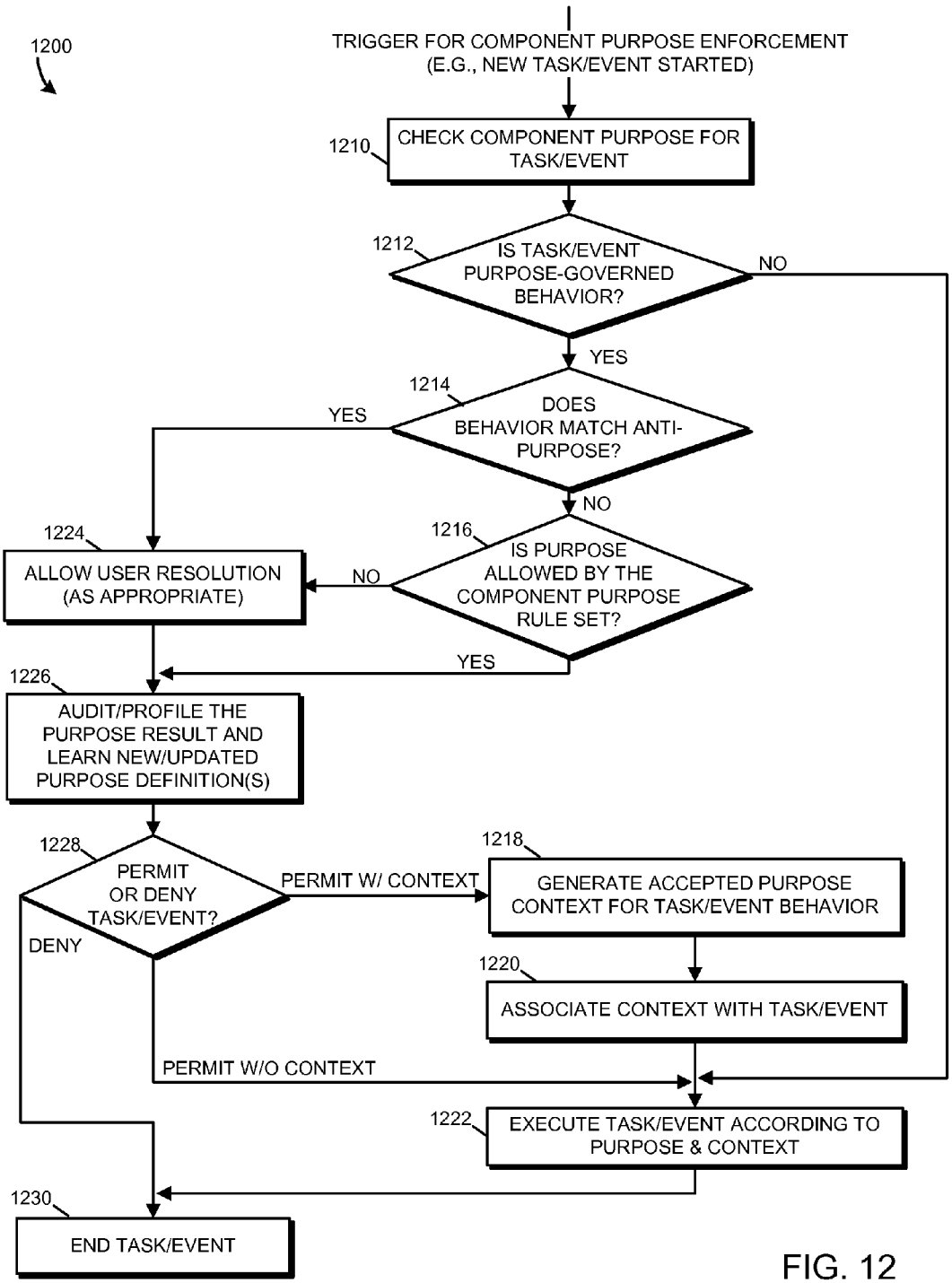
FIG. 12 is a simplified flow diagram of at least one embodiment of a method for enforcing a component purpose as disclosed herein.

Referring now to FIG. 12, an illustrative method 1200 for enforcing a component-specific purpose during operation of the platform/system 100, 600 is shown. The method 1200 may be embodied as computerized programs, routines, logic and/or instructions executed by the computing platform 100 or by the computing system 600 (by the provisioning subsystem 134, 254, 650, for example). At block 1210, the method 1200 is initiated by an electronic communication indicating a request or trigger for component purpose enforcement, such as a new task or event that is received or started by an executing component. At block 1212, the platform/system 100, 600 identifies the type of task or event being requested by the component 526, 654, to determine if the detected task/event is governed by any rules in the applicable component purpose rule set 526, 654. In some cases, new or unrecognized task/events may be evaluated and associated with a task/event type or classification. The task/event type may be used, for example, to distinguish task/events from one another at a higher level of abstraction (e.g., to categorize them), so that every individual task/event need not be separately analyzed. If the task/event is not governed by one or more of the component purpose(s) (where a component may have multiple different purposes as described herein), the platform/system 100, 600 executes the task/event as requested, at block 1222. If the task/event is governed by one or more component purpose(s), at block 1214, the platform/system 100, 600 compares the behavior of the component task/event to the anti-purpose(s) (1214) and then the purpose(s) (1216) defined for the component (e.g., as implemented in the component purpose rule set 526, 654). If the behavior of the task/event matches one or more of the defined anti-purpose(s) (block 1214) or does not match a purpose (block 1216), the platform/system 100, 600 allows a user, user agent, or VPA, for example, to resolve the conflict between the task/event behavior and the purpose/anti-purpose(s) (block 1224) and proceeds to block 1226. If the task/event behavior matches a purpose that is permitted by the component rule set (block 1216), the method 1200 proceeds to block 1226. At block 1226, the platform/system 100, 600 logs the task/event information and the result of the purpose/anti-purpose analysis (e.g., the purpose result 546), and determines whether to permit (e.g., without a purpose context), purpose permit (e.g., endorse the task with a purpose context) or deny the task/event (block 1228). As used herein, "purpose permit" may refer to, among other things, the platform/system 100, 600's ability to enable task/events with a purpose context that is not necessarily restrictive. For example, in some embodiments, the purpose context can serve as (and encapsulate) both a simple or fine grain (restrictive) description of the accepted task/event and/or as a guarantee of security by providing a digitally signed security context (e.g. token implementation).

At block 1226, the determination to permit, purpose permit, or deny the task/event may be based on user input received at block 1224, may be the result of machine learning conducted at block 1226 (e.g., the component purpose or anti-purpose may be modified based on, for example, a prior history of user or task/event behavior), or other criteria. If the platform/system 100, 600 determines that the task/event should be denied, the task/event is ended (e.g., application closed or terminated), at block 1230. If at block 1228 the platform/system 100, 600 determines that execution of the task/event should be permitted without purpose context/enforcement, the task/event is executed (block 1222). If at block 1222 the platform/system 100, 600 determines that execution of the task/event should be permitted, the platform/system 100, 600 may add a permissive/audit caveat to the purpose context and generate an "aggregate" purpose context as described below (modified as needed in accordance with the applicable component purpose(s), resource-specific rule(s), and/or context-specific rule(s)) at block 1218, associate the permitted context with the task event (block 1220), and execute the task/event in accordance with the purpose and context, at block 1222.

If at block 1214 the platform/system 100, 600 determines that the task/event's behavior does not match any of the anti-purposes associated with the component, the platform/system 100, 600 determines whether the behavior of the task/event matches a purpose in the component purpose rule set 526, 654, at block 1216. If there are no rules in the component purpose rule set 526, 654, the platform/system 100, 600 at block 1224 notifies the user that the requested task/event is associated with a purpose that is currently not implemented in the component purpose rule set 526, 654, and follows the path through blocks 1226, 1228, 1230 in a similar manner as described above. In this way, component purposes and rule sets can be dynamically created and modified at runtime, for example in response to component task/events that may not have been anticipated at the time the component was initially purpose-provisioned. If at block 1216 the platform/system 100, 600 determines that the task/event's behavior or purpose corresponds to a rule in the component purpose rule set 526, 654, the platform/system 100, 600 at block 1218 determines and annotates an acceptable operating context for the task/event behavior based on the purpose/anti-purpose rules matched in blocks 1214 and 1216 and any permissive or user resolution events in blocks 1224 and 1226. To do this, the platform/system 100, 600 analyzes the task/event behavior and applies the matching context-specific rules in the component purpose rule set 526, 654. Upon final compilation of the purpose context, portions of the context may include digital signatures from applicable rule matches. As an example, a bank may digitally sign a purpose rule that allows for transactions from a specific resource (account) owner to transfer less than X funds.

In addition, the entire context may be digitally signed as an endorsement of the applicable rules that were evaluated and enforced. This can, for example, provide a form of attestation to a "component resource receiver" that the purpose enforcement engine is operating. At block 1220, the platform/system 100, 600 associates the acceptable/approved context determined at block 1218 with the task/event (e.g., by generating a purpose trust token 554, 656). At block 1222, the platform/system 100, 600 executes the approved task/event in accordance with the approved purpose and context, and the task/event ends at block 1230.

The foregoing methods and processes are simplified for discussion purposes, but it should be understood that the platform 100 and/or the computing system 600 may undertake any of the foregoing methods or processes concurrently or in parallel, e.g., for each of the executing domains 260, 270 and/or any components thereof. For example, the platform 100 and/or the computing system 600 may perform an analysis of any provisioning triggers 510, 516 that it receives from any or all of the domains 260, 270 or other components 280, in whatever order or sequence they may occur.

Example Usage Scenarios

Embodiments of the above-described component provisioning techniques can provide dynamic, finer-grained control of components of electronic devices that has many potential applications. For example, some embodiments of the provisioning subsystem 134, 254, 650 can be used to supplement and extend existing static mobile device policies that are managed by mobile device management services and other third parties to a virtualized, multiple-personality mobile computing platform or mobile virtual appliance. Purposed, component-specific provisioning as described herein is applicable to banking, financial, healthcare, medical, enterprise, and personal applications, among others.

In one example, a bank's mobile banking application includes an account access component for a bank account managed ("owned") by the bank. The component rule set associated with the account access component specifies that the end user cannot directly read or write data to the bank account (e.g., to prevent the user, or someone who has infiltrated the user's device, from attempting to hack into the bank's computing infrastructure). The bank provides a purpose trust token with the account access component when it is provisioned. The purpose trust token may be used as part of the user authentication procedure, and may be unique to user. Further, the purpose trust token maybe only valid on the provisioned device (e.g., the user's device on which the banking application is installed). The token, and its provisioned purposes, may be mapped to only apply to certain bank accounts. Additional restrictive and permissive criteria may also be applied to a token so that, for example, it is only valid when used by a specific user domain (execution environment) or context). Further, the user may customize the token so that different rules apply in different contexts in which the account access component may be used. The user may customize the token so that his or her retirement accounts may be only be accessed with permission to read general information, and so that write or transaction access is denied unless the user is a trusted party, such as a fiduciary or wealth manager appointed by the user.

In another example, a user may customize a purpose trust token so that only certified medical professionals may unlock medical records stored on the user's mobile device. Further, a user's customized purpose trust token may permit only certain trusted parties (e.g., a beneficiary or appointed fiduciary) to access a living will or power of attorney stored on the user's device. Similarly, the user may create and share purpose trust tokens to allow only certified law enforcement officers to access the user's driver's license stored on the user's mobile device, or to allow only certified customs officers to access passport information. In some cases, tokens may have time or persistence limitations (e.g., tokens may expire after passage of a defined amount of time).

In still another example, purpose trust tokens may be used to control third party accesses to social media pages. Purpose trust tokens may be established so that third party logins to, e.g., FACEBOOK or LINKEDIN, permit the user's identity to be verified, but deny access to the user's entire Facebook profile.

Other applications of the foregoing provisioning techniques can be applied to smart appliances, mobile virtual appliances, etc. In a "smart home" environment, many traditional but now networked/smart appliances and devices (such as entertainment systems, home security systems, heating and cooling systems, kitchen appliances, clocks, vehicles etc.) can communicate with and thus be controlled by mobile electronic devices. For example, a home entertainment system may be provisioned by the user's mobile device to be permitted to use the mobile device's music player application (e.g., ITUNES) and denied access to all other applications on the mobile device. Similarly, a home refrigerator may be provisioned to be permitted to communicate grocery inventory data (e.g., RFID-tagged goods located in the refrigerator) to a grocery application on the user's mobile device, but denied access to all other applications on the mobile device. Such networked appliances and other devices may be provided with purpose trust tokens to continue to access their provisioned resources on the mobile devices long as the trust tokens are valid.

In still other applications, purpose trust tokens may be used to establish and rescind and transfer real time control of systems under control of the computing device. In systems where the mobile computing device may serve as a real time controller for networked or connected systems such as robotics, strategic unmanned aerial vehicles (SUAVs) and machine systems.

Additional Examples

In accordance with at least one aspect of this disclosure, a computing platform includes a processor, storage media accessible by the processor; and a provisioning system embodied in the storage media and executable by the processor to provision a provisionable component of a plurality of provisionable components for use on the computing platform, where each of the provisionable components are executable by the processor, and the provisioning system selectively provisions the provisionable component independently of the provisioning of the other provisionable components.

The provisioning system may be memory-isolated from each of the provisionable components. The provisionable components may include an operating system, and the provisioning system may provision the provisionable component independently of the operating system. The processor may include an applications processor, the computing platform may further include a baseband processor, and the provisionable component provisioned by the provisioning system may be executable by the baseband processor. The provisionable components may include a software stack executable on the computing platform, and the provisionable component selectively provisioned by the provisioning system may be a component of the software stack. The provisionable component may be a non-user installable component of the computing platform and the provisioning system may be executable by the processor to provision the non-user installable component for use on the computing platform independently of the other provisionable components. The provisioning system may be executable by the processor to access data relating to a user-specific purpose of the non-user installable component and provision the non-user installable component for use on the computing platform in accordance with the user-specific purpose. The provisioning system may be executable by the processor to access data relating to a user-specific purpose of the provisionable component and provision the provisionable component for use on the computing platform in accordance with the user-specific purpose. The provisioning system may be executable by the processor to access data relating to an anti-purpose corresponding to the user-specific purpose, where the user-specific purpose may relate to a permitted function of the provisionable component, the anti-purpose may relate to one or more unpermitted functions of the provisionable component, and the provisioning system is executable by the processor to provision the provisionable component to perform the permitted functions and not to perform the unpermitted functions. The user-specific purpose of the provisionable component may associate an operating context of the computing platform with the user-specific purpose and the provisioning system may be executable by the processor to provision the provisionable component for use on the computing platform in accordance with the user-specific purpose and the associated operating context. The computing platform may include a virtualization service executable by the processor to virtualize one or more of the provisionable components, and the provisioning system may be controlled by the virtualization service. The computing platform may include a mobile computing device. The computing platform may include a server of a cloud computing environment. The provisioning system may provision an executable component on the computing platform to communicate with another device over a network.

In accordance with at least one aspect of this disclosure, a method for provisioning a processor-executable component for use on a computing platform includes, with the computing platform, determining a purpose associated with the use of the component on the computing platform, the purpose defining a permitted use of the component in a specified operating context of the computing platform; deriving an anti-purpose from the purpose, the anti-purpose indicating at least one unpermitted use of the component based on the purpose; developing a purpose-based rule set for the component based on the purpose and the anti-purpose, the purpose-based rule set executable by the computing platform; generating a purpose trust token including the purpose-based rule set and an authentication credential usable to authenticate the purpose-based rule set for the component; and verifying the purpose trust token prior to provisioning the component on the computing platform.

The method may include receiving a plurality of purpose definitions from a plurality of entities associated with the component including an end user of the computing platform, compiling the plurality of purpose definitions, obtaining acknowledgment of the compiled purpose definitions from each of the entities associated with the component, and developing the purpose-based rule set based on the compiled purpose definition. The method may include generating a purpose trust token for each of the entities associated with the component, wherein each of the purpose trust tokens for each of the entities is different. The method of claim 17, wherein at least one of the entities associated with the component is a candidate recipient of a resource of the component, wherein the resource comprises a physical or virtual resource that can be shared with the candidate recipient. The method may include receiving the purpose as a conversational natural language dialog input and algorithmically interpreting the conversational natural language dialog input, and developing the purpose-based rule set based on the interpreted conversational natural language dialog input. The method may include securing the purpose trust token by executing a cryptographic hash algorithm with the purpose trust token and a user-specified salt as inputs to the cryptographic hash function and associating the secure purpose trust token with the component. The method may include executing the purpose-based rule set to enforce the purpose and deny the anti-purpose while the component is running on the computing platform. The method may include determining a resource of the component, the resource comprising a physical or virtual item that can be shared by the component with at least one entity. The method may include determining a candidate recipient of the resource, and determining, based on the purpose-based rule set, if the candidate recipient is permitted access to the resource.

In accordance with at least one aspect of this disclosure, a provisioning system for a computing platform including a plurality of memory-isolated, independently executable domains includes instructions embodied in machine accessible storage media and executable by one or more processors to determine a first purpose relating to use of an executable component in a first domain of the plurality of domains on the computing platform; provision the executable component for use in the first domain according to the first purpose; determine a second purpose relating to use of the executable component in a second domain of the plurality of domains, the second purpose being different than the first purpose; and provision the executable component for use in the second domain according to the second purpose.

The provisioning system may be executable to determine an anti-purpose corresponding to the first purpose, where the first purpose relates to a permitted use of the executable component in the first domain and the anti-purpose relates to an unpermitted use of the executable component in relation to the first purpose, and to provision the executable component to enable use of the executable component for the permitted use in the first domain and prevent use of the executable component for the unpermitted use in the first domain. The second purpose may enable a different permitted use of the executable component in the second domain. The provisioning system may be executable to provision a second executable component for use in the first domain according to a third purpose, where the second executable component is different than the first executable component and the third purpose relates to a permitted use of the second executable component that is not a permitted use of the first executable component. The provisioning system may be executable to provision the executable component for a first permitted use in the first domain in response to a first operational context of the computing platform and provision the executable component for a second permitted use in the first domain in response to a second operational context of the computing platform, and where the first operational context is different than the second operational context. The provisioning system may be executable to provision the executable component to permit a resource of the executable component to be used for the purpose in response to a detected operational context of the computing platform and not used in response to other operational contexts of the computing platform. The provisioning system may be executable to provision the executable component to permit the resource to be used for a different purpose in the second domain.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated. For instances, features, structures, and characteristics having the same or similar names but shown in multiple figures and/or embodiments with different reference numerals may have any of the features, structures or characteristics of the other similarly-named elements, whether or not explicitly stated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:
1. A computer-implemented method, comprising:
   initiating, on a computing device, a trusted computing base for dynamically provisioning a shared component, wherein the shared component is associated with a shared component rule set, wherein the shared component rule set includes a set of permitted operations associated with a purpose, wherein the shared component is associated with one or more prior requests to interact with the shared component, and wherein the one or more prior requests to interact with the shared component are associated with one or more prior usage descriptions;

receiving a new request to provision the shared component, wherein the new request includes a new usage description;
determining a new purpose associated with the new request, wherein the new purpose is determined using the new usage description;
determining a new set of permitted operations associated with the new purpose;
updating the shared component rule set with the new set of permitted operations; and
dynamically provisioning the shared component using the updated shared component rule set, wherein provisioning the shared component includes facilitating an interface between a domain and the shared component, and wherein the interface includes the new set of permitted operations.

2. The method of claim 1, further comprising:
monitoring the interface between the domain and the shared component for a purpose enforcement trigger.

3. The method of claim 1, further comprising, facilitating an interface between a second domain and the shared component.

4. The method of claim 1, further comprising:
accessing a purpose ontology;
determining a new set of permitted operations using the purpose ontology; and
updating the shared component rule set using the new set of permitted operations.

5. The method of claim 1, further comprising:
receiving a shared component rule set update; and
updating the shared component rule set using the shared component rule set update.

6. The method of claim 1, further comprising:
authenticating the shared component, wherein the shared component is associated with a trusted owner and a security key.

7. The method of claim 6, further comprising:
authenticating the shared component rule set, wherein the shared component rule set is associated with the trusted owner and the security key.

8. The method of claim 1, further comprising:
determining an anti-purpose associated with the purpose, wherein the anti-purpose is associated with a set of prohibited operations;
identifying an anti-purpose rule set associated with the set of prohibited operations;
updating the shared component rule set with the set of prohibited operations; and
facilitating an update to the interface between the domain and the shared component, wherein the update includes the set of prohibited operations associated with the anti-purpose.

9. The method of claim 1, wherein the new request includes a purpose trust token, and wherein the purpose trust token includes an authentication credential.

10. The method of claim 9, further comprising:
verifying the purpose trust token prior to provisioning the shared component.

11. The method of claim 1, wherein the shared component rule set includes a set of permitted operations associated with a shared component resource.

12. The method of claim 1, wherein the shared component rule set includes a context specific set of permitted operations.

13. The method of claim 1, wherein the new request includes an instruction to download a new shared component.

14. A computing device, comprising:
one or more processors; and
a non-transitory computer-readable medium including instructions that, when executed by the one or more processors, cause the one or more processors to perform operations including:
initiating, on the computing device, a trusted computing base for dynamically provisioning a shared component, wherein the shared component is associated with a shared component rule set, wherein the shared component rule set includes a set of permitted operations associated with a purpose, wherein the shared component is associated with one or more prior requests to interact with the shared component, and wherein the one or more prior requests to interact with the shared component are associated with one or more prior usage descriptions;
receiving a new request to provision the shared component, wherein the new request includes a new usage description;
determining a new purpose associated with the new request, wherein the new purpose is determined using the new usage description;
determining a new set of permitted operations associated with the new purpose;
updating the shared component rule set with the new set of permitted operations; and
dynamically provisioning the shared component using the updated shared component rule set, wherein provisioning the shared component includes facilitating an interface between a domain and the shared component, and wherein the interface includes the new set of permitted operations.

15. The computing device of claim 14, wherein the non-transitory computer-readable medium further comprises instructions that, when executed by the one or more processors, cause the one or more processors to perform operations including:
monitoring the interface between the domain and the shared component for a purpose enforcement trigger.

16. The computing device of claim 14, wherein the non-transitory computer-readable medium further comprises instructions that, when executed by the one or more processors, cause the one or more processors to perform operations including:
facilitating an interface between a second domain and the shared component.

17. The computing device of claim 14, wherein the non-transitory computer-readable medium further comprises instructions that, when executed by the one or more processors, cause the one or more processors to perform operations including:
accessing a purpose ontology;
determining a new set of permitted operations using the purpose ontology; and
updating the shared component rule set using the new set of permitted operations.

18. The computing device of claim 14, wherein the non-transitory computer-readable medium further comprises instructions that, when executed by the one or more processors, cause the one or more processors to perform operations including:
receiving a shared component rule set update; and
updating the shared component rule set using the shared component rule set update.

19. The computing device of claim 14, wherein the non-transitory computer-readable medium further comprises instructions that, when executed by the one or more processors, cause the one or more processors to perform operations including:

authenticating the shared component, wherein the shared component is associated with a trusted owner and a security key.

20. The computing device of claim 19, wherein the non-transitory computer-readable medium further comprises instructions that, when executed by the one or more processors, cause the one or more processors to perform operations including:

authenticating the shared component rule set, wherein the shared component rule set is associated with the trusted owner and the security key.

21. The computing device of claim 14, wherein the non-transitory computer-readable medium further comprises instructions that, when executed by the one or more processors, cause the one or more processors to perform operations including:

determining an anti-purpose associated with the purpose, wherein the anti-purpose is associated with a set of prohibited operations;

identifying an anti-purpose rule set associated with the set of prohibited operations;

updating the shared component rule set with the set of prohibited operations; and facilitating an update to the interface between the domain and the shared component, wherein the update includes the set of prohibited operations associated with the anti-purpose.

22. The computing device of claim 14, wherein the new request includes a purpose trust token, and wherein the purpose trust token includes an authentication credential.

23. The computing device of claim 22, wherein the non-transitory computer-readable medium further comprises instructions that, when executed by the one or more processors, cause the one or more processors to perform operations including:

verifying the purpose trust token prior to provisioning the shared component.

24. The computing device of claim 14, wherein the shared component rule set includes a set of permitted operations associated with a shared component resource.

25. The computing device of claim 14, wherein the shared component rule set includes a context specific set of permitted operations.

26. A computer-program product tangibly embodied in a non-transitory machine-readable storage medium of a computing device, including instructions configured to cause one or more processors to:

initiate, on a computing device, a trusted computing base for dynamically provisioning a shared component, wherein the shared component is associated with a shared component rule set, wherein the shared component rule set includes a set of permitted operations associated with a purpose, wherein the shared component is associated with one or more prior requests to interact with the shared component, and wherein the one or more prior requests to interact with the shared component are associated with one or more prior usage descriptions;

receive a new request to provision the shared component, wherein the new request includes a new usage description;

determine a new purpose associated with the new request, wherein the new purpose is determined using the new usage description;

determine a new set of permitted operations associated with the new purpose; update the shared component rule set with the new set of permitted operations; and dynamically provision the shared component using the updated shared component rule set, wherein provisioning the shared component includes facilitating an interface between a domain and the shared component, and wherein the interface includes the new set of permitted operations.

27. The computer-program product of claim 26, further comprising instructions that, when executed by the one or more processors, cause the one or more processors to:

monitor the interface between the domain and the shared component for a purpose enforcement trigger.

28. The computer-program product of claim 26, wherein the new request includes a purpose trust token, and wherein the purpose trust token includes an authentication credential.

29. The computer-program product of claim 26, wherein the shared component rule set includes a set of permitted operations associated with a shared component resource.

30. The computer-program product of claim 26, wherein the shared component rule set includes a context specific set of permitted operations.

* * * * *